US009984668B1

(12) United States Patent
Miller

(10) Patent No.: US 9,984,668 B1
(45) Date of Patent: May 29, 2018

(54) MUSIC EFFECTS PROCESSOR

(71) Applicant: Jerry A. Miller, Raleigh, NC (US)

(72) Inventor: Jerry A. Miller, Raleigh, NC (US)

(*) Notice: Subject to any disclaimer, the term of this patent is extended or adjusted under 35 U.S.C. 154(b) by 0 days. days.

(21) Appl. No.: 15/728,577

(22) Filed: Oct. 10, 2017

Related U.S. Application Data

(63) Continuation of application No. 15/067,303, filed on Mar. 11, 2016, now Pat. No. 9,812,106.

(51) Int. Cl.

| | |
|---|---|
| ***G01H 1/14*** | (2006.01) |
| ***G10H 7/00*** | (2006.01) |
| ***G10H 1/02*** | (2006.01) |
| ***G10H 1/00*** | (2006.01) |
| ***G10H 1/36*** | (2006.01) |
| ***G10H 3/00*** | (2006.01) |
| ***G10H 1/14*** | (2006.01) |

(52) U.S. Cl.
CPC ................. *G10H 1/14* (2013.01); *G10H 1/00* (2013.01); *G10H 1/0041* (2013.01); *G10H 1/0091* (2013.01); *G10H 1/02* (2013.01); *G10H 1/36* (2013.01); *G10H 1/366* (2013.01); *G10H 3/00* (2013.01); *G10H 7/00* (2013.01); *G10H 2210/066* (2013.01); *G10H 2210/325* (2013.01); *G10H 2240/211* (2013.01); *G10H 2250/641* (2013.01)

(58) Field of Classification Search
CPC ............... G10H 7/00; G10H 1/02; G10H 1/14
USPC ..................................................... 84/626, 603
See application file for complete search history.

(56) References Cited

U.S. PATENT DOCUMENTS

| | | | | |
|---|---|---|---|---|
| 5,262,586 A * | 11/1993 | Oba | G10C 3/00 | 84/723 |
| 5,422,956 A * | 6/1995 | Wheaton | H04R 3/00 | 381/122 |
| 5,739,452 A * | 4/1998 | Nagata | G10H 1/366 | 381/63 |
| 5,792,971 A * | 8/1998 | Timis | G10H 1/0008 | 369/83 |
| 5,973,252 A * | 10/1999 | Hildebrand | G10H 1/02 | 84/603 |
| 6,259,015 B1 * | 7/2001 | Takahashi | G10H 1/0041 | 84/601 |
| 9,318,086 B1 * | 4/2016 | Miller | G10H 1/02 | |
| 2002/0005111 A1 * | 1/2002 | Ludwig | G10H 1/00 | 84/645 |
| 2004/0016338 A1 * | 1/2004 | Dobies | G10H 1/0091 | 84/662 |
| 2004/0099128 A1 * | 5/2004 | Ludwig | G10H 1/00 | 84/662 |

(Continued)

*Primary Examiner* — David Warren
*Assistant Examiner* — Christina Schreiber
(74) *Attorney, Agent, or Firm* — Jerry A. Miller; Miller Patent Services

(57) ABSTRACT

A method in accord with certain implementations involves, at an audio input, receiving a time domain audio signals; at one or more digital signal processors: converting the time domain audio signal to a frequency domain representation containing at least a fundamental frequency component, modifying the frequency domain representation to produce a modified frequency spectrum, converting the modified frequency spectrum to a modified time domain audio signal; and outputting the modified input signals as an output signal. This abstract is not to be considered limiting, since other embodiments may deviate from the features described in this abstract.

20 Claims, 17 Drawing Sheets

(56) References Cited

U.S. PATENT DOCUMENTS

| | | | | |
|---|---|---|---|---|
| 2006/0130637 | A1* | 6/2006 | Crebouw | G10L 19/0204<br>84/603 |
| 2007/0175318 | A1* | 8/2007 | Izumisawa | G10H 1/0091<br>84/626 |
| 2007/0191976 | A1* | 8/2007 | Ruokangas | G10H 1/02<br>700/94 |
| 2007/0237344 | A1* | 10/2007 | Oster | H04R 3/00<br>381/113 |
| 2008/0156178 | A1* | 7/2008 | Georges | G10H 1/0025<br>84/645 |
| 2008/0254824 | A1* | 10/2008 | Moraes | A45F 5/00<br>455/556.1 |
| 2012/0180618 | A1* | 7/2012 | Rutledge | G10H 1/38<br>84/610 |
| 2012/0297959 | A1* | 11/2012 | Serletic | G06F 3/0481<br>84/626 |
| 2013/0000464 | A1* | 1/2013 | Kirsch | H04S 7/301<br>84/609 |
| 2013/0112065 | A1* | 5/2013 | Rutledge | G10H 1/38<br>84/603 |
| 2013/0182861 | A1* | 7/2013 | Kapp | G10H 1/0091<br>381/61 |
| 2014/0000440 | A1* | 1/2014 | Georges | G10H 7/00<br>84/609 |
| 2014/0109751 | A1* | 4/2014 | Hilderman | G10H 1/38<br>84/613 |
| 2014/0169795 | A1* | 6/2014 | Clough | G06F 19/3418<br>398/106 |

* cited by examiner

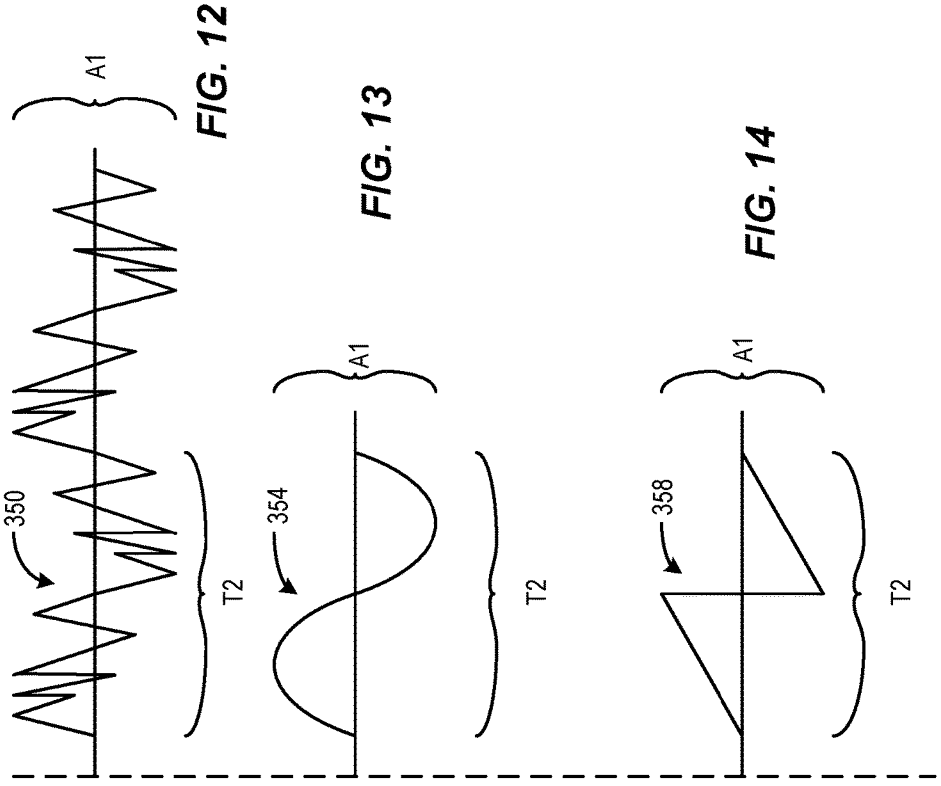
FIG. 12
FIG. 13
FIG. 14
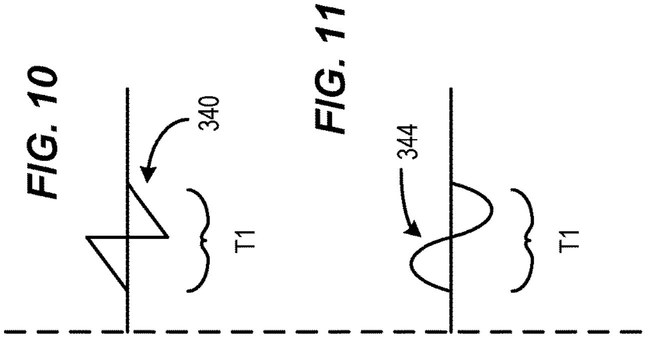
FIG. 10
FIG. 11

860

MUSIC EFFECTS PROCESSOR

CROSS REFERENCE TO RELATED DOCUMENTS

This application is a continuation application of allowed U.S. patent application Ser. No. 15/067,303 filed Mar. 11, 2016 which is a continuation of Issued U.S. patent application Ser. No. 14/014,638 filed Aug. 30, 2013 (now U.S. Pat. No. 9,318,086) which is related to and claims priority benefit of U.S. Provisional Patent Application 61/698,041 filed Sep. 7, 2012 and U.S. Provisional Patent Application 61/701,170 filed Sep. 14, 2012, each of which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Effects processors, also called by various names such as pedals or stomp boxes, are commonly used by musicians, especially electric guitarists, bass players and increasingly by vocalists, to modify the sound from their guitar, bass or voice before amplification or within an amplifier's effects loop. Such effects processors can be based on analog or digital signal processing.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 10 is an example of a time domain sample of an input sound 108 consistent with certain embodiments of the present invention.

FIG. 11 is an example of extraction of a fundamental frequency of the signal shown in FIG. 10 in a manner consistent with certain embodiments of the present invention.

FIG. 12 is an example of a complex input signal to the musical instrument effect processor 116 consistent with certain embodiments of the present invention.

FIG. 13 is an example depicting extraction of a time domain fundamental frequency signal of the signal of FIG. 12 in a manner consistent with certain embodiments of the present invention.

FIG. 14 is an example of a replicated output signal from musical instrument effect processor 116 in a manner consistent with certain embodiments of the present invention.

DETAILED DESCRIPTION

Figure 1:
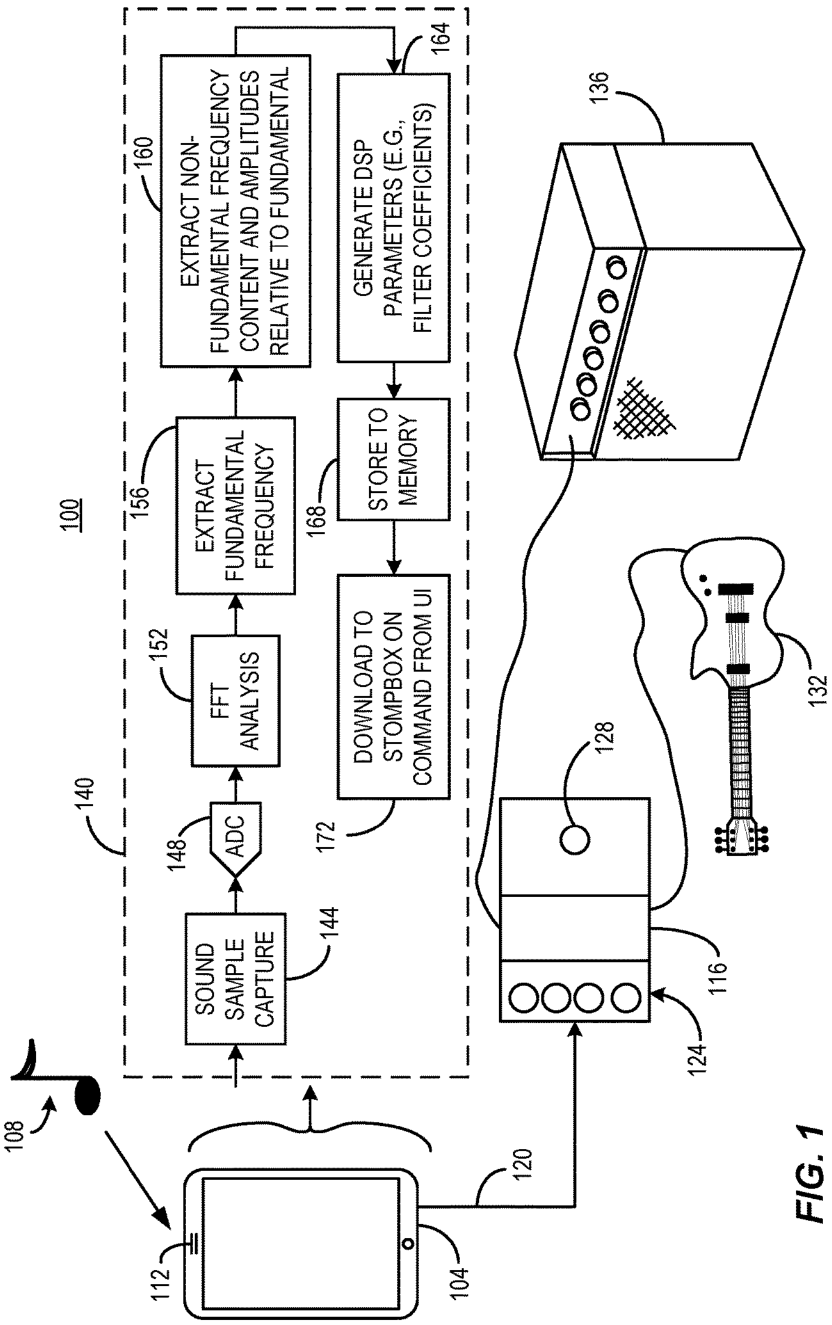
FIG. 1 is an example hybrid block diagram flow chart depicting an example implementation of a system and process consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a one or more computers or a computer system (including systems that use one or more programmable digital signal processors of any suitable architecture). A "program", or "computer program", may include a subroutine, a function, a digital filter, a digital signal generator, a procedure, an object method, an object implementation, in an executable application, an applet, a servlet, a source code, an object code, a script, an application, an "App", a program module, a shared library/dynamic load library and/or other sequence of instructions designed for execution on a computer system. Such programs may rely on data or other program parameters used to alter the operation of the program. A "memory" is any type of electronic storage device such as RAM or ROM or EEROM or disc storage and the term memory encompasses storage devices in any suitable configuration including removable and expandable memory devices.

Reference throughout this document to "one embodiment", "certain embodiments", "an embodiment", "an example" "an implementation", "certain implementations" or similar terms means that a particular feature, structure, or characteristic described in connection with the embodiment is included in at least one embodiment of the present invention. The term "exemplary" is intended to mean an example and not necessarily a preferred or required example. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or (non-exclusive or) meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A "musical instrument effects processor" or simply "effects processor" is a device that is used to electronically alter the sound of voice or musical instrument along an electrical chain from the instrument through an amplification or reproduction system. Such devices are also commonly referred to as "stomp boxes", "pedals", or simply "effects". These terms will be used interchangeably herein, and are further intended to include rack mounted equivalents and multiple effect processors that can store and operate to produce multiple serial or parallel effects or "patches" without limitation. Classic examples include distortion and overdrive units, reverb units, delay units, preamplifiers, equalizers, fuzz boxes, flangers, wah wah pedals, compressors, volume pedals, and multi-function pedals. The term "effect" can also be used herein to mean the actual change in sound caused by the effect processor. Many classic effect processor devices utilize analog technology but many such devices are now commonly produced using digital signal processors (DSP) as defined below. While many analog effects have become "gold standards" in the music industry in terms of their particular audio characteristics, the ability to process in the digital domain can have many advantages over processing signals in the analog domain, and as more powerful processing at higher sampling rates is used, the quality of the sound produced by digital processors is now rivaling and in many respects surpassing that of many classic analog pedals. Such pedals are most popular with electric guitarists and electric bass guitarists, but can be used with other instruments and even with vocals.

In the present discussion, the effect processor is depicted as operating in a monaural mode, but those skilled in the art will appreciate that implementations that utilize stereo or other multiple channel effects are also possible and contemplated hereby, with the illustration being simplified by depicting only a single channel. Additionally, the present description depicts one or more digital signal processors operating to carry out the digital effects. The term "digital signal processor" is intended to mean both plural and singular and includes not only commercially available or proprietary DSP circuits, but also any circuit configured to process a signal in a manner that can be programmed to cause musical effects including devices that carry out digital filtering, signal generation, pitch shifting, time stretching, time compression, amplitude compression, envelope processing, phase shifting, pitch detection, pitch correction, signal synthesis, signal alteration, (effects) etc. without limitation. Such effects have been programmed and commercialized by various manufacturers under product or company names such as DigiTech™, Zoom™, TC Electronic™, Line 6™, Vox™, Boss™, Roland™, Electro Harmonix™ and others.

A "hand held computer" is intended to mean a smartphone such as Apple Computer Corporation's IPhone® or other smartphone such as those that operate on the Google's Android® operating system or other operating system, or a tablet computer such as Apple Computer Corporation's IPad® or other tablet computers such as those based on Google's Android operating system, or other small computerized devices that can be readily held in the hand and carried about. While preferred devices as described herein utilize such hand-held computers, other implementations can utilize self contained effects devices or can operate in cooperation with personal computers. Use of the term "tablet" or "smartphone" the like as a specific example herein is not intended to be anything other than a shorthand nomenclature for the full array of such devices and is thus not intended to be limiting over other devices that can serve in a similar capacity for purposes of realizing implementations consistent with the present teachings.

In the marketplace, several manufacturers such as some of those noted above are at this writing providing digital effects processors based on one or more DSPs that can be programmed or personalized with downloadable data and/or programs and/or "patches" (downloadable to the digital effects processor) to create a desired effect or modify or establish the personality of a particular effect. Such effects are based upon several commercially available DSP circuits such as the proprietary AudioDNA2™ processor or various commercially available DSPs from manufacturers such as Freescale or Texas Instruments to name but a few. Some products utilize COSM™ (composite object sound modeling) while others use other technologies to achieve the desired digital signal processing effects. Several different architectures are used within available DSPs including, but not limited to reduced instruction set computer (RISC) processors, Harvard architecture, modified Harvard architecture, Von Newman, and combinations of the above.

Notably, in the marketplace a DigiTech™ product known and commercially avialable as IStomp™ (Trademarks of Harman International) utilizes Apple Computer products such as the IPad® or IPhone® that run an App called Stomp Shop™ as an intermediary for purchase, configuring to some degree (i.e. color of an LED on the stomp box) and download of various effect personalities that can then be loaded into the IStomp generic musical instrument effects processor. The iStomp then takes on a digital rendition of the effect of a particular stomp box whose digital equivalent program is downloaded thereto in order to assume a changeable personality.

Often such digital musical instrument effect processors are based upon digital simulation of classic analog devices or upon preset effect configurations representing a particular artist and/or song. In other cases, the effect being provided by the musical instrument effect processor is simply a digital rendition of commonly available effects such as distortion, overdrive, fuzz, phaser, flanger, echo, reverb, chorus, amplification, envelope processing, etc. that is designed specifically for a particular effect processor. In accord with certain implementations consistent with the present teachings, entirely new effects can be readily created by a musician without need for programming knowledge. Such effects can be generated, by way of example and not limitation, by capturing a sample of an audio sound using the microphone already forming a part of a smartphone (or tablet or the like) (or in other implementations part of the stomp box or connectable thereto, or as a separate input to the hand held computer or stomp box). An App, for example, residing within the smartphone then processes the captured sample of audio to extract any basic (or more complex) characteristics of the audio sample. Such characteristics might include frequency spectrum relative to a fundamental, in one example, or an actual sample in another example. These characteristics can then be downloaded to a musical instrument effects processor (stompbox) for use in "coloring" the sound of a musical instrument connected to an audio system through the effects processor. This can be accomplished in configurations where the smartphone or tablet or the like is used only as a conveyance to the effects processor and then decoupled, or in which the smartphone or tablet or the like remains connected to the effects processor and operates in any suitable manner in cooperation with the effects processor. Other variations are also disclosed.

In one simple example, a frequency analysis can be used to extract the fundamental frequency of a sample of audio, and the relative amplitude and phase of the harmonic components of the sample of audio can also be captured. A representation of this information can be ported to a stompbox's digital signal processor so that the stompbox can modify an incoming instrument signal with some (any) attribute of the originally captured sample of audio in order to color the instrument signal. At the stompbox, the fundamental frequency of the sampled signal can be mapped to that of the input signal (e.g., using technology similar to that used in DSPs for pitch shifting) so as to generate harmonic content relative to the input signal that resembles that of the sample of the audio signal. In this manner, the output of the effects processor resembles the sound of the captured signal. In one example, the processing, at least in part, can involve use of a look-up table that maps input amplitude to output amplitude as but one example of processing.

For example if the sound that is captured and sampled is that of a human voice singing a single note, the output signal can be manipulated using digital signal processing to have certain characteristics resembling the voice that is sampled (e.g, matching of certain harmonic content). While it is possible, with intensive and accurate enough analysis of the input audio sample, to produce an output of the effects processor that will very closely resemble the characteristics of the input audio sample, reaching this level of accuracy may require more complex signal analysis than those used to produce simpler effects processing. While each is possible, it is also possible to achieve interesting, amusing, unique, musical and useful effects without the present teachings being constrained to any standard of near perfection in modeling of the input sound, and nothing herein is intended to imply that near perfect modeling of the signal that is sampled is required for certain implementations so long as a characteristic of the signal that is sampled is used to modify the input signal, e.g., from an instrument such as a guitar.

In another example, generation of a particular set of harmonics to an input signal can be used to relatively accurately capture the essence of a sound. For example, if a sound has a spectrum of a square wave, this can be produced from a sine wave input by generation of a known set of harmonics with a particular phase and amplitude relationship to the primary frequency components of an input signal, so that if the sound contains those harmonics, the effects processor output may be a close approximation without need for the analysis to be overly complex. This processing is similar to that currently used to produce distortion and fuzz effects in certain DSP based stomp boxes.

Other sounds that have distinctive attack, decay and amplitude envelope or phase envelope properties may suggest that accurate replication may be more complex and utilize more sophisticated signal analysis. Such is also contemplated within the scope of the present teachings.

In another simple example as will be discussed further, the tablet or similar device can be used to capture a sample (either using an internal or connected microphone, or by editing a sound file or using another microphone input) that is loaded as a sound sample to the musical instrument effects processor. Once this sample is stored, it can be pitch shifted and played back at the pitch of an incoming instrument signal when a new note is detected or an attack that is generally associated with plucking or sounding a new note is detected. The playback can be a single repetition of the sample, stretched or compressed versions of the sample, repeating copies of the sample or continuously repeating copies that are strung together or stretched without interruption. The playback can either be a direct playback without volume manipulation, or the volume (amplitude) can track an amplitude envelope of the amplitude of the input signal being converted, for example. Echo and reverb effects can also be produced by use of delayed playback of the samples or outputs with decaying amplitude. Those skilled in the art will envision many variations upon consideration of the present teachings.

While the present discussion in certain embodiments focuses on use of conversion to the frequency domain to process the sampled audio and generate a characterization of the spectrum of the audio sample to color the audio at the effects processor, those skilled in the art will recognize that other types of analysis can also be utilized (e.g., time domain analysis, wavelet domain analysis or combinations of the above. Those skilled in the art will appreciate that time domain manipulation of the audio signals is often more readily realized in the time domain and nothing discussed herein is intended to exclude such time domain analysis.).

In various implementations, the musical instrument effects processor can be configured to modify electrical representations of input audio signals by playback of the at least the portion of the audio sample, or by pitch shifting the digital copy of the captured sample of the audio sound, or by generation of harmonics of a fundamental frequency of the input signal, or by detecting a pitch of the input audio signal and modifying the input audio signal using pitch shifted versions of the captured sample of the audio sound. In other implementations, the musical instrument effects processor can be configured to modify electrical representations of input audio signals by filtering the electrical representation of the input audio signals at a pitch shifted version of a spectrum derived from the captured sample of the audio sound. For example, the input sample can be analyzed with a FFT to determine spectral content and digital filter weighting factors can be derived from this spectrum for use in digital filtering in the effects processor. Many variations will occur to those skilled in the art upon consideration of the present teachings, and these variations can be achieved without need for a musician to directly program a DSP.

In certain illustrative examples, the processing carried out is done in the frequency domain. However, in many instances, manipulation of an audio signal is much faster and more easily realized in the time or wave domain. Hence, although certain of the present examples are depicted in the frequency domain, those skilled in the art will appreciate that any extraction of DSP parameters are consistent with the present teachings without regard for how those DSP parameters are extracted from the audio used as an input sound as will be depicted below. That is, the present teachings are not limited to use of frequency domain signal processing as depicted in the illustrated examples.

Turning now to FIG. 1, an example system 100 is shown in a hybrid block diagram and flow chart depiction. A portable computer device such as a smartphone 104 or tablet is used to capture a sound 108 represented by a musical note symbol by use of the tablet 104's internal built in microphone 112. This sound can be stored in digital form within the smartphone 104 for processing as will be described. The smartphone 104 can be connected to musical instrument effects processor 116 (stomp box) via a cable 120 or via a wireless connection such as a BlueTooth™ wireless connection in order to download one or more effects to the effects processor 116. It is noted, that while the effects processor 116 is depicted as a conventional floor box, some musicians prefer to mount such devices on a pedal board (not shown) or prefer to use rack mounted equivalents of such devices, each of which is contemplated and equivalent herein. In other examples, the effects processor could form a part of an amplifier or musical instrument or microphone without limitation.

Stomp box effects processor 116 is depicted as having a set of variable controls 124 that act as potentiometers (e.g., controlling volume, tone, bass, treble, gain, intensity of effect, blend with unprocessed input, truncation of harmonics, number of repeats, decay properties, etc.) or effect controls such as switches as well as one or more (one shown) switches 128 which may be used to actuate and de-actuate (e.g., with either true bypassing or with buffering) an effect and may also be a multi-function switch which can be used to establish a tap tempo for effects that allow the user to dynamically alter a rhythm of an effect such as an echo or slap-back or other effect with a speed parameter. Other user interface controls such as an LED or other light that depicts a mode of operation, touchpad controls, switches, knobs or other switch and control configurations can be used to establish a desired user interface as desired. The stomp box 116 can be connected to a musical instrument such as a guitar 132 (or microphone or other musical instrument) whose output signal serves as an input to the stomp box 116 and passes through stomp box 116 for processing into an output signal that then proceeds eventually to an amplifier 136 for reproduction. It is noted that multiple such effects processors 116 may be configured in series or parallel as desired for a particular sound. In other implementations, the user may prefer to connect stomp box 116 into an effects loop if one is provided by the amplifier; and in many instances multiple effects processors may be connected in series either as a single multi-effects processor or as multiple stomp boxes.

Smartphone 104 (or tablet, etc.) can carry out any of several operations as contemplated by certain implementations consistent with the present teachings. In a first example implementation, the process depicted in FIG. 1 as process 140 is carried out. In this example, an App residing within the smartphone 104 (such App, for example having been downloaded from a suitable App store over the Internet in a known manner, i.e., for a fee) is initiated and enabled or set to capture sound 108 at 144 using the smartphone's internal microphone 112. This captured sound is then digitized using an analog to digital converter (ADC) 148 which is a common operation within a smartphone 104. This digitized sample of sound 108 is automatically stored (not shown) within the smartphone and then automatically processed in this implementation using a discrete Fourier transform (DFT) under control of the App, preferably using a fast Fourier transform (FFT) analysis routine at 152 in this implementation. In this example, at 156 the frequency domain output of the FFT analysis routine 152 can be used to ascertain a fundamental frequency of the stored sample of sound 108. By extracting the fundamental frequency of the stored sample of sound 108, pitch shifting algorithms can later be applied in the stomp box effects processor 116 to match an incoming signal's fundamental frequency from, for example, guitar 132 to produce a desired output having a matching fundamental frequency. In process 152, one technique for automatically extracting a fundamental frequency, can be to simply identify the largest frequency component, where comparable values of magnitude of multiple frequencies are likely resolvable by selection of the lowest frequency high magnitude signal or by user intervention.

The stored sample of sound 108, as processed by FFT 152 can further be used at 160 to extract the non-fundamental frequencies in the spectrum of the stored sound. These non-fundamental components are additive to the fundamental (with appropriate correction for phase shifts) to the fundamental in order to characterize the stored digitized version of the input sound 108. Once the relative magnitudes and phases of the various harmonics and other frequency components of the fundamental are characterized by the FFT analysis as is generally described above, a set of parameters for use in processing by one or more digital signal processors DSPs residing within the effects processor 116 can be extracted at 164 from the FFT analysis and these parameters can be stored at 168 (e.g., to a library of effects either at the effects processor 116, the smartphone 104 or in a storage device that can be accessed by the effects processor to change its personality) which can be named or assigned metadata or an icon or all of the above for later retrieval and loading into the effects processor 116. In one example, these parameters can be the information that is required by the processor 116 to carry out pitch shifting, filtering, an inverse FFT at a pitch shifted frequency corresponding to an input signal or other function to the processor 116.

Once stored by the App residing on smartphone 104, this set of parameters can be retrieved and downloaded at 172 by user interaction from a user interface provided by the App residing within the smartphone 104 to the effect processor 116. Those skilled in the art will appreciate that while not explicitly shown, the effects processor 116 can blend the signal from the instrument 132 in "dry" form with the processed signal in "wet" form together in any proportion (e.g., under user control) in order to provide additional shaping of the effect or preservation of a component of the original signal from the instrument 132 at the effect processor output. Moreover, the wet form can be modified so as to track a time domain amplitude envelope of the dry signal. Other controls can be provided for truncation of frequency components, tone control, output level, or other variations will occur to those skilled in the art upon consideration of the present teachings.

The above process of generation of the DSP parameters is depicted in the frequency domain utilizing a FFT to extract frequency characteristics and a phase analysis can be carried out in cooperation with the FFT analysis in order to determine the phase relationship between the fundamental and non-fundamental frequencies if desired. When these DSP parameters are loaded into the effect processor 116, the input signal from instrument 132 is automatically shaped in order to produce an output sound. In this example the output sound can have a spectrum with component characteristics resembling the spectrum of the sound 108 as described. In one example, this can be accomplished using an inverse FFT to regenerate signals at a frequency obtained by analysis of the input signal from instrument 132 to obtain its fundamental frequency and then generate an inverse FFT at a pitch shifted frequency corresponding to a fundamental of the input signal from instrument 132. Similarly pitch shifted versions of other harmonics of the input signal from instrument 132 can also be similarly altered. In addition, controls 124 can be configured to carry out various functions including truncation of the number of harmonics added or processed, blend with dry signal, output level, tone, etc. Other variations are also possible so long as some (any) characteristic obtained from the sampled sound 108 is used to modify the signal from instrument 132 in any manner. In the present discussion, the speed of calculation of an FFT or inverse FFT can be enhanced by truncation of certain components such as by omission of the higher order components in certain implementations if desired as previously mentioned.

Those skilled in the art will also appreciate upon consideration of the present teachings that the effects processor 116 may be embedded within either the guitar 132 or other musical instrument (including a microphone for vocal applications) or within the amplifier 136, with suitable access by the user to activate and deactivate and control the effect.

Figure 2:
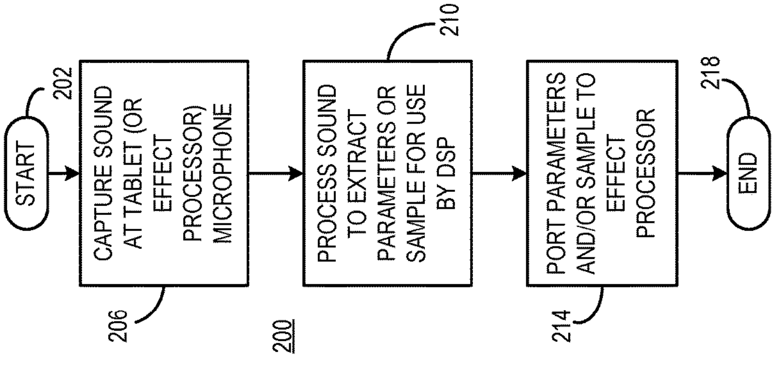
FIG. 2 is a flow chart of an example of a process for extracting digital signal processing parameters from a sample of a sound in a manner consistent with certain embodiments of the present invention.

This process is depicted in block diagram form in FIG. 2 as an example process 200 starting at 202. At 206, a sound is captured at a microphone or other input (e.g., a stored audio sample) to the tablet, smartphone or even directly at the effects processor, as will be described later. This sample is then processed at 210 to extract DSP parameters using any suitable process and those DSP parameters are downloaded to a memory within the effects processor at 214 for use by the effects processor in automatically manipulating an input signal in near real time from a musical instrument or other microphone (in the case of voice) so that no delay from input to output is perceived by the listener (unless the particular effect is designed to produce a perceived delay). The process ends at 218.

In one non-limiting example, the DSP parameters may define the spectral content of the input sample, which can then be replicated at a pitch shifted frequency with a matching attack and decay envelope. Other variations are also possible.

Figure 3:
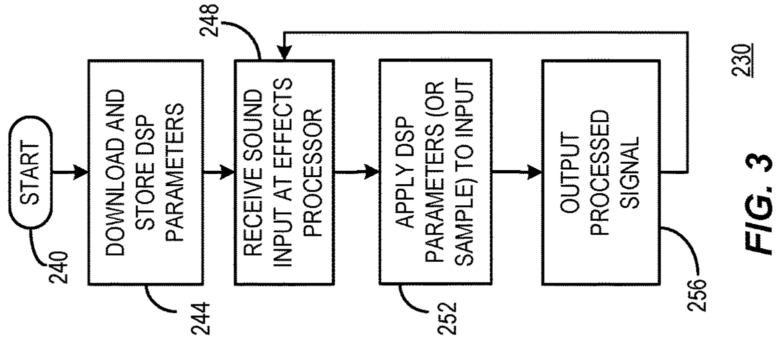
FIG. 3 is a flow chart of an example of a process for modification of an input signal by an effects processor in a manner consistent with certain embodiments of the present invention.

As noted above, the DSP parameters are downloaded (if the embodiment calls for downloading or porting) to the effects processor 116. The process from the perspective of the effects processor is generally depicted in FIG. 3 as process 230 starting at 240 after which the effects processor 116 receives a download or porting of the DSP parameters from an external source at 244. At 248, when the effects processor receives a signal representing a sound at its input, the signal is automatically converted to a digital form that can be manipulated at 252 by its DSP(s) and the DSP parameters (or other effects such as a signal sample as will be discussed later) is applied to the input signal in a manner defined by the DSP parameters and associated DSP programming. The DSP may be programmed to reproduce the spectrum of the sound 108 by generation of appropriate spectral components or by filtering with weighted digital filtering taps (e.g., using an input to output lookup table or conventional digital filtering configuration) or any other suitable process so as to manipulate the input signal to produce an output at 256. Since the effects processor operates in the digital domain, the input signal is received at the effects processor 116 and sampled at the Nyquist rate for audio or preferably a higher rate such as 44 Khz. Digital conversion is usually preferably at a high number of bits such as at least 24 or 32 bits for good audio quality, but these particular parameters are not to be considered limiting since lower or higher sampling rate and bits of resolution may be desirable for certain effects or for speed or cost considerations. Hence, when the output (which has been returned to analog form in most cases) is provided at 256, the process returns to 248 to receive another sample of the input for processing. All processing of the input signal from the instrument should occur at near real time.

It should be noted that certain implementations described herein utilize the processor within the smartphone 106 or similar device to carry out an analysis and generation of DSP parameters, it is also possible to port a digital version of the audio sample of sound 108 to the musical instrument effects processor 116 where the audio sample can be analyzed and DSP processing parameters can be derived from the sample using the processing power of the musical instrument effects processor 116. Other data including program instructions for execution by the DSP may be ported from smartphone 106 to the processor 116 so that the processor 116 understands how to analyze and produce DSP parameters and/or use the parameters once generated. Many variations are contemplated and it is to be emphasized that the actual preprocessing in preparation for near real time manipulation of the signal from instrument 132 can be carried out on the smartphone 106, processor 116 or a remote processor via a network such as the Internet without limitation.

Figure 4:
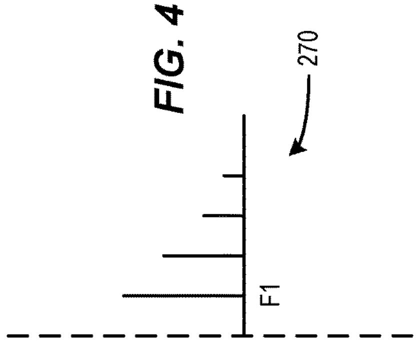
FIG. 4 is an example of a simple frequency spectrum of a sample of an input signal having fundamental frequency F1 consistent with certain embodiments of the present invention.
Figure 5:
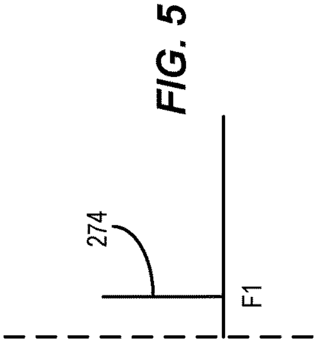
FIG. 5 is an example frequency spectrum of the extracted fundamental frequency of the spectrum depicted in FIG. 4 (i.e., the spectral components except for the fundamental have been removed) in a manner consistent with certain embodiments of the present invention.

The process described above using an illustration of the frequency spectrum of an input signal that can be analyzed to produce an effect at effects processor is depicted in the frequency domain in FIGS. 4-8 as follows. FIG. 4 depicts at 270 a frequency spectrum of an input signal as determined by FFT or other analysis of input signal 108 and having a fundamental frequency F1. The fundamental frequency F1 is in this case may be presumed in certain implementations to be the largest and usually lowest frequency in the spectrum and is shown in FIG. 5 as spectral line 274. The remainder of the spectral lines depicted in FIG. 4 represents the non-fundamental spectral components. After analysis, DSP parameters such as relative frequency of non-fundamental spectral components and amplitudes relative to the fundamental or their equivalent can be loaded into a memory of the effects processor 116.

Figure 6:
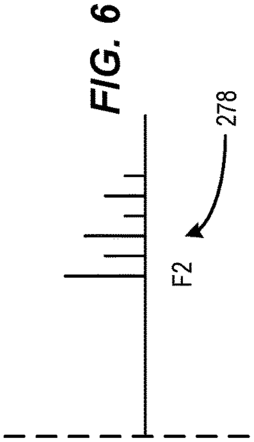
FIG. 6 is a simple example of a frequency spectrum for an input signal to an effects processor having fundamental frequency F2 consistent with certain embodiments of the present invention.
Figure 7:
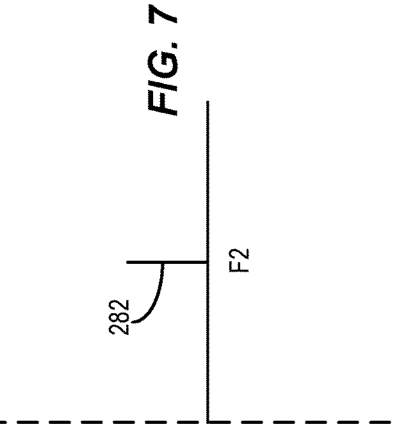
FIG. 7 is an example of an extracted fundamental frequency F2 extracted from the spectrum of FIG. 6 (i.e., the spectral components except for the fundamental have been removed) in a manner consistent with certain embodiments of the present invention.
Figure 8:
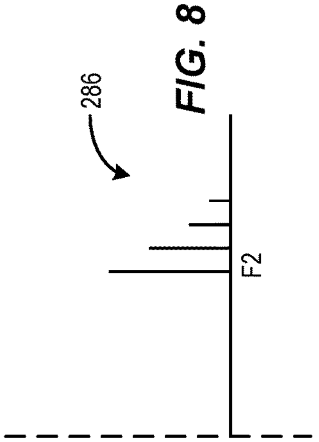
FIG. 8 is an example of a frequency spectrum of a signal constructed at a pitch shifted frequency of the spectrum of FIG. 4 shifted to the fundamental frequency of the spectrum of FIG. 7 in order to insert the spectral components of spectrum 270 (thereby effectively swapping the input spectrum for the spectrum 270) in a manner consistent with certain embodiments of the present invention.

In FIG. 6, spectrum 278 is an example intended to represent the input signal from an instrument such as 132 to effects processor 116 where as a part of the DSP analysis, the fundamental frequency F2 of the input signal to effects processor 116 is extracted as shown in the frequency domain as 282 in FIG. 7. In certain implementations, the additional spectral lines as depicted in FIG. 4 can be replicated at a pitch shifted frequency and phase (either with respect to only the fundamental of the input signal or in other implementations with respect to all frequency components or the major frequency components or a subset of the frequency components of the input signal) to correspond to the effect processor 116 input fundamental frequency F2 shown as 286 in FIG. 8. In many implementations, the spectrum 286 will actually be modified by addition of a measured or user controlled portion of the “dry” signal represented by spectrum 278 of FIG. 6 and/or further by production of non-fundamental components of the spectrum 278 to the non-fundamental spectral components of spectrum 286. Many variations will occur to those skilled in the art upon consideration of the present teachings. However, in each case an input signal 108 is captured, analyzed and DSP parameters are produced therefrom for use in modification of an input signal from an instrument 132 or the like (in any way related to the captured sample audio signal 108) to effects processor 116 to produce effects processor output signals as a special effect to provide variation in the musical characteristics of the musical instrument 132. Moreover, while the representation shown is in the frequency domain, this can be viewed as a frequency domain representation of time or wave domain processing without limitation.

Figure 9:
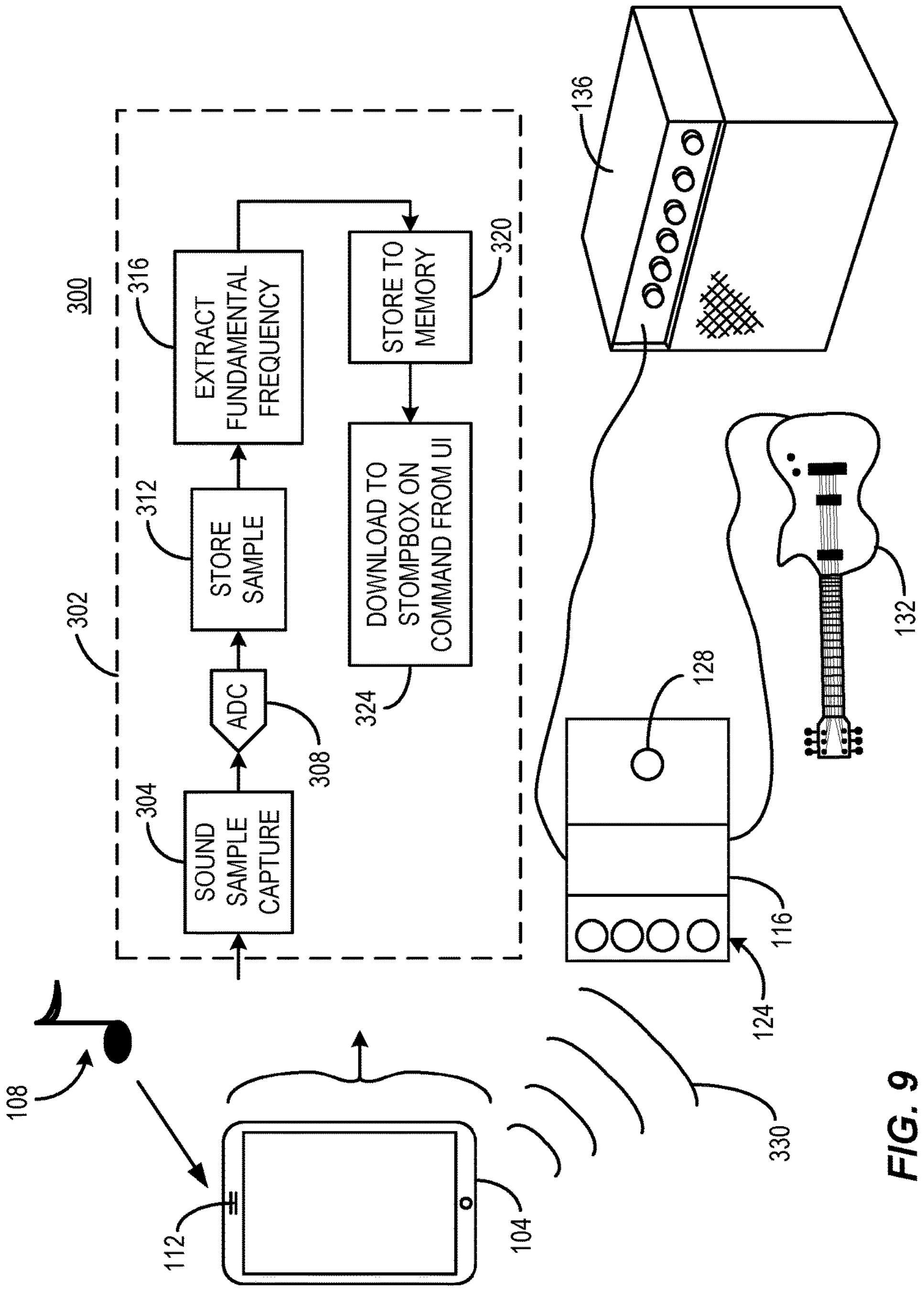
FIG. 9 is an example hybrid block diagram flow chart depicting another example implementation of a system and process consistent with certain embodiments of the present invention.

Referring now to FIG. 9, another example system 300 is depicted in which again a sound 108 is captured at 304 by the microphone 112 of a smartphone 104 (or other portable computing device such as a tablet, etc.). Within the smartphone 104, the process 302 starts with the sound being captured at 304. This sound is converted to a digital representation as a sequence of sampled signal amplitudes by analog to digital converter 308. This digitized representation of the sound is stored at 312. At 316, the fundamental frequency is ascertained by any suitable method including, but not limited to an automated analysis of a FFT of the sound sample or time domain analysis, for example. This fundamental frequency can thus be associated with the sound sample as stored at 312 and is stored in memory at 320. The stored sample and the fundamental frequency along with suitable DSP programming code can thus be downloaded or ported at 324 to the musical instrument signal processor 116 upon a user instruction to do so via a user interface of the smartphone 104. In this example, the fundamental frequency can be used by the signal processor in a pitch shifting algorithm to shift the pitch of the stored sample of the captured sound so as to be shifted to a fundamental frequency produced by instrument 132. The stored sample of the sound 108 can then be time stretched, time compressed, truncated, repeated, amplitude modified or otherwise played back in whole or in part at a pitch varying in accord with the frequency output by the instrument 132, thereby altering the instrument’s sound for amplification by amplifier 136. As with any such special effect, the output may be blended with dry input from the instrument 132, or with a signal that is altered from instrument 132 in another manner.

It is further noted that in this example, the wired interconnection between the smartphone 104 and the musical instrument effects processor has been depicted as a wireless connection 330 such as a BlueTooth™ or infrared wireless connection or near field communication connection or any other suitable wireless connection. Any such mechanism for interconnection can be used with any embodiment consistent with the present teachings. So, in certain implementations, a hand held computer has a set of parameters for use by a musical instrument effects processor. A wired or wireless interface can be used to communicate the parameters to the musical instrument effects processor.

A simple illustration of one process consistent with that depicted in FIG. 9 is shown in a time domain representation in FIGS. 10-14. At FIG. 10, an example sound 108 is depicted, which for ease of illustration is shown as a sawtooth or triangular wave 340 having a period T1 that defines the fundamental frequency of the triangle wave. Note that a sequence of such triangle waves could be the input from which the sample 340 is extracted as representative thereof. FIG. 11 depicts extraction of the fundamental frequency represented by the sinusoid 344 having the same period T1, which from Fourier analysis is known to be the fundamental of a sequence of sinusoids that form the spectrum of signal 340.

Referring now to FIG. 12, consider a complex input 350 to the instrument effects processor 116 having a peak to peak amplitude, which at present will be considered constant with value A1, and having a fundamental frequency corresponding to period T2 (a lower frequency in this example). This fundamental frequency is represented by a sinusoid 354 (conceptually) of FIG. 13 also having amplitude A1 and period T2. Using pitch shifting and amplitude control (amplification or attenuation), the input signal can be replaced with a sawtooth signal 358 as depicted in FIG. 14 that is similar to the captured sound sample 340 except that its amplitude is changed to A1 and its period stretched to T2 in order to completely change the character of the instrument 132's normal sound. Of course, this is a simplified and extreme example, but is consistent with certain implementations. Additionally, rather than a simple amplitude conversion to fixed amplitude A1, an amplitude envelope analysis of the input signal can be carried out to establish an output amplitude envelope of the colored "wet" signal produced by effects processor 116. Moreover, a warbling of the period or blending of the wet signal from the effects processor 116 with the dry input or other variations can be produced without departing from the teachings herein. Other variations will occur to those skilled in the art upon consideration of the present teachings.

Figure 15:
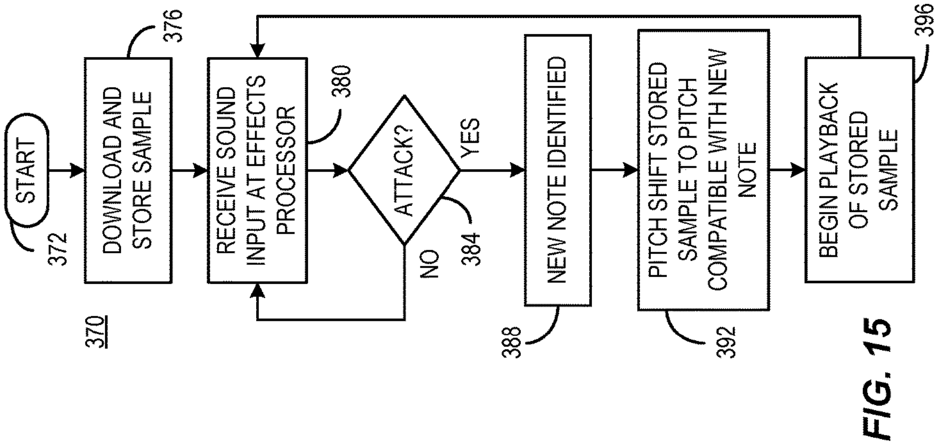
FIG. 15 is a flow chart of another example of a process for modification of an input signal by a musical instruments effects processor in a manner consistent with certain embodiments of the present invention.

The process depicted above in FIGS. 10-14 can be described generally by the flow chart depicted as 370 in FIG. 15 starting at 372 after which the musical instrument effect processor 116 downloads and stores the sample—possibly along with fundamental frequency information (which could also be determined at effect processor 116) and possibly programming instructions that define the personality of the musical instrument effect processor 116 at 376. Such programming instructions can be devised based on the type of effect that is to be implemented using the audio sample 108 as a spectral or time domain template. At this point the musical instrument effect processor 116 is programmed for its personality.

When a signal is received from instrument 132 as an input signal at 380, the input signal is analyzed to determine if its "attack" is to be interpreted as a new note (e.g., plucking of a pick or change in fundamental frequency) at 384. If so, a new note has been identified at 388 and the process proceeds to 392 where the stored sample is pitch shifted to a note compatible with the input signal's fundamental frequency. At 396, the pitch shifted sample is played back until a new note is identified at 384 and 388. The playback can be at constant amplitude, or the sample's amplitude can be varied to follow an amplitude or other envelope of the original input signal, or can be made to swell or decay in any suitable manner that can be envisioned by those skilled in the art upon consideration of the present teachings.

Figure 16:
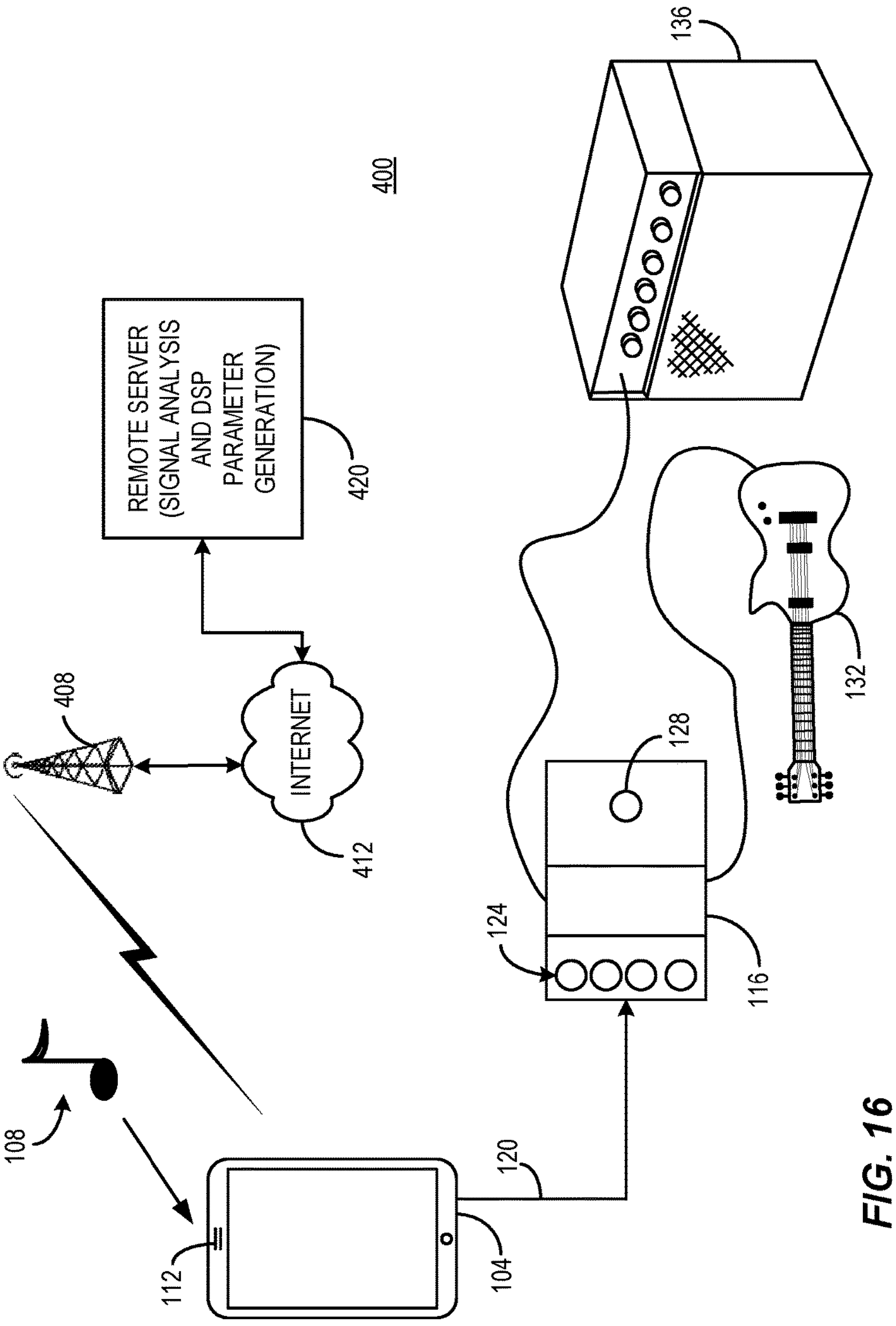
FIG. 16 is an example of a system consistent with certain embodiments of the present invention in which analysis of a sound sample is carried out at a remote server.

Referring now to FIG. 16, an alternative implementation is depicted as 400 in which any suitable processing of the captured signal is to be carried out in the musical instrument effect processor 116. In this example, rather than have the input sound processed by the processor of the smartphone (tablet, etc.), the sound 108 is digitized and sent via an Internet connection (e.g., 3G or 4G or wired or wireless Ethernet, etc.). This connection is depicted as connection to a cell phone tower 408 which sends the sound sample via the Internet 412 to a remote server 420 for signal analysis and production of DSP parameters and possibly processing code, etc. (In one example, this can be done for a fee.). This information in the form of DSP parameters and possibly program code is then returned to the smartphone 104 for porting or downloading to musical instrument effect processor 116 in the manner previously described. In other implementations, the musical instrument effect processor 116 may be Internet enabled and may thus receive the DSP parameters, etc. via an Internet connection. Other variations will occur to those skilled in the art upon consideration of the present teachings.

Figure 17:
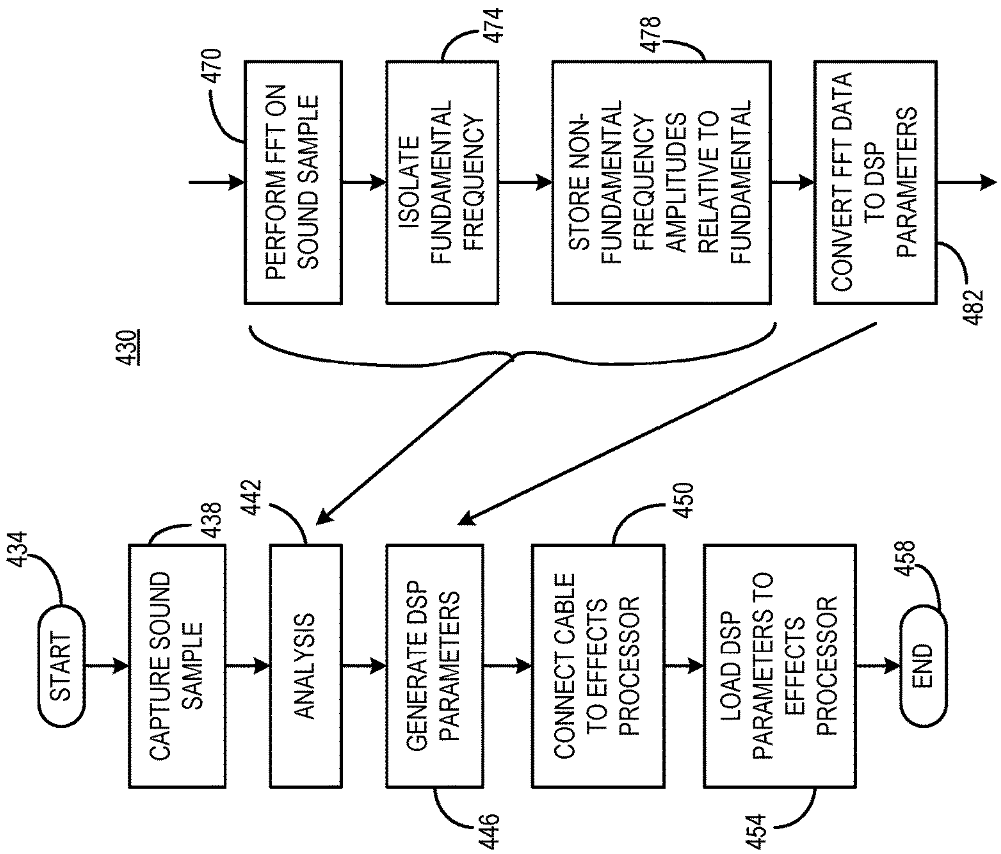
FIG. 17 is an example of a flow chart depicting a process for analysis of an input sound sample and production of DSP parameters therefrom in a manner consistent with certain embodiments of the present invention.

With reference to FIG. 17 an overall illustration of the process used to develop the signal coloration produced in the musical instrument effect processor 116 is depicted as process 430 with the leftmost portion of the flow chart being intended to represent a generalized process and the right side depicting one non-limiting example of analysis and generation of DSP parameters. The process starts at 434 after which a sound sample is captured at 438. This sound sample is digitized and analyzed at 442 and DSP processing parameters and other information is generated at 446. An effects cable is connected between the portable computing device 104 and the musical instrument effect processor 116, or in alternative embodiments, a wireless or equivalent Internet connection is established at 450, in order to load the DSP parameters and other information used to establish the personality of the musical instrument effect processor 116 at 454 and the process ends at 458 with the new personality of the musical instrument effect processor 116 having been established. In a variation, the sample can be processed at the effects processor 116 to extract the DSP parameters or can be processed remotely via an Internet connection to a server to generate the DSP parameters (e.g., for a fee). In these examples, the process is rearranged somewhat so as to port the sample of sound 108 earlier to another entity for processing.

In one example implementation depicted in the flow chart portion at the rightmost side of FIG. 17, the analysis 442 may include performing an FFT on the sound sample at 470 and isolating a fundamental frequency thereof at 474 (e.g., by selecting a lower frequency with high relative amplitude). The non-fundamental frequencies are stored at 478 with relative levels compared with the frequency deemed to be the fundamental. At 482, the DSP parameters are created by, in this example, conversion of the FFT data to DSP parameters used to generate signals having similar spectral content to that of the original sample. This example is provided by way of illustration of one effect implementation and many variations are possible without departing from the present teachings.

Figure 18:
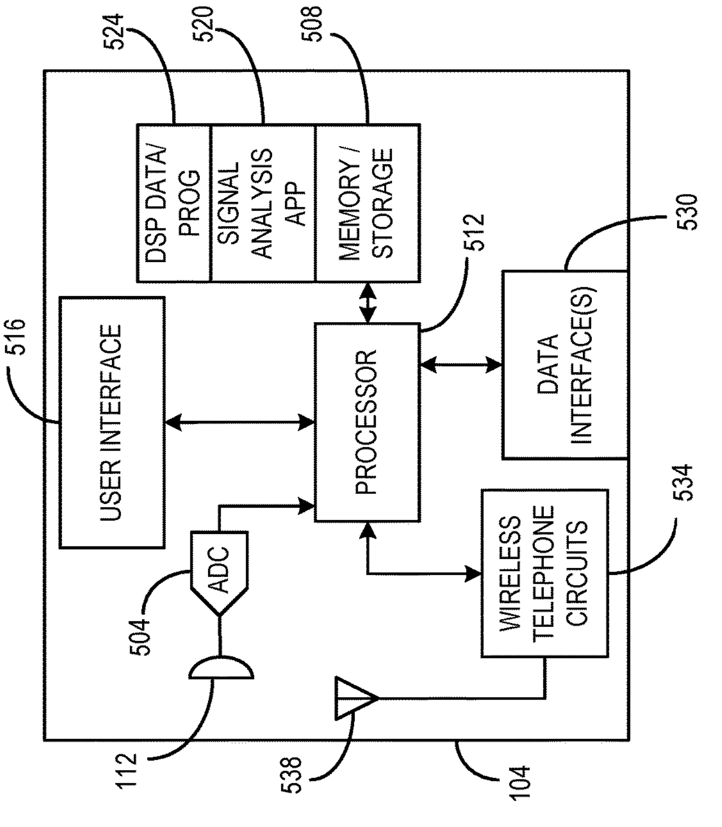
FIG. 18 is an example of a block diagram of an implementation of a tablet computer or smartphone or the like that can be used in a manner consistent with certain embodiments of the present invention.

An example of a smartphone 104 (or similar device) as used in connection with certain illustrative embodiments is depicted in FIG. 18. In this example implementation, a device such as Apple Computer's IPhone™ series of products can be adapted to the functionality described above. In this example, sounds received at microphone 112 are converted to digital form at analog to digital converter 504 which are stored within a memory or storage device 508 by processor 512. The capture of the audio signal at microphone 112 is carried out under user control via a user interface 516 such as a touchscreen interface. Memory and storage device 508 includes, among other things including operating system and telephone control etc., one or more applications or Apps such as a signal analysis App 520 that analyzes the sample and in accord with its specific programming and generates a set of DSP parameters including data and perhaps specific program code associated with APP 520's function that is stored at 524.

On instruction from the user via user interface 516, the appropriate programming and DSP parameters stored in memory and storage device 518 can be transferred via any suitable data interface 530 in the manner previously described using any suitable protocol. In the case that device 104 is a smartphone it will further include other circuitry such as wireless telephone circuitry 534 operating in conjunction with a radio frequency antenna 538. In the case of a tablet computer or the like, other support circuitry not shown may be present and configured in any suitable manner in order to operate as a tablet computer, e-reader or the like.

Figure 19:
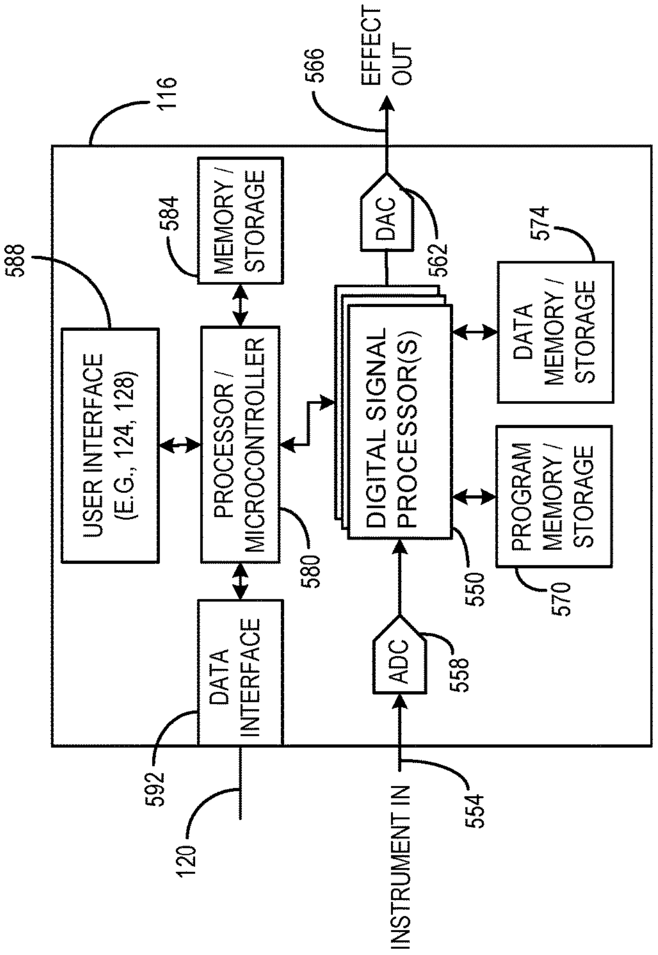
FIG. 19 is an example block diagram of an implementation of a musical instrument effect processor consistent with certain embodiments of the present invention.

The musical instrument effect processor 116, in one illustrative example implementation is depicted in FIG. 19 which at its heart is one or more digital signal processors 550 such as defined above having any suitable architecture (e.g., Harvard or modified Harvard or Von Newman architecture or a hybrid of these, etc.) receives signals from a musical instrument at an input 554 that are converted to digital form at analog to digital converter (ADC) 558 for processing by the one or more DSP(s) 550 as described to produce an output in the form of a digitized audio signal that is converted to analog by digital to analog converter (DAC) 562 to produce the analog output at 566. This output at 566 is colored or otherwise modified by the DSP(s) to produce the analog output having the desired modification.

Depending upon the architecture of the DSP(s) the memory may be configured in a variety of ways and as depicted utilizes one portion of memory/storage 570 for programming and the other portion of memory 574 as data memory/storage (as is typical of Harvard architecture), but other configurations can also be used depending upon the DSP hardware configuration. Any suitable configuration of hardware can be arranged to provide the DSP memory, and such memory can include removable memory for changes in personality of the effects processor 116.

Also depicted is a processor or microcontroller 580 which may be configured as a part of the DSP(s) 550 or as a separate processor that oversees operation of the musical instrument effect processor 116. Processor 580 may utilize its own memory/storage or area of memory/storage depicted separately for convenience as 584. The musical instrument effect processor 116 has a user interface 588 previously depicted as having switches and potentiometers such as 124 and 128, but which may also include other controls such as displays, light emitting diodes or other controls as will be appreciated by those skilled in the art in light of the present teachings. In the architecture depicted in FIG. 19, processor 580 is arranged to receive and supply input and output to the user interface 588 as well as to receive programming such as from connection 120 via one or more data interfaces (wired or wireless) shown generally as data interface 592.

While not explicitly shown for ease of illustration, when an effect processor 116 is disengaged from the signal chain, it generally provides a path for the dry signal that can either be a true bypass that actually bypasses all circuitry, or uses a buffer amplifier with a gain approximating one with, for example, a low impedance output to drive subsequent effects in the signal chain. Those skilled in the art will appreciate that these elements or similar would be included in such an effects processor 116.

Figure 21:
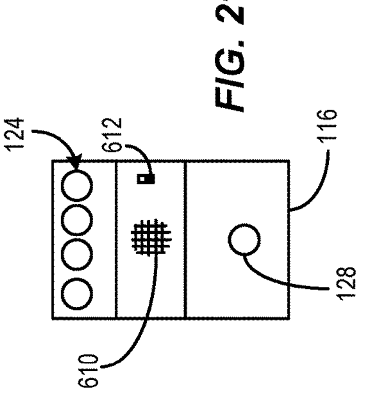
FIG. 21 is another example variation of an implementation of a musical instrument effect processor consistent with certain embodiments of the present invention.
Figure 20:
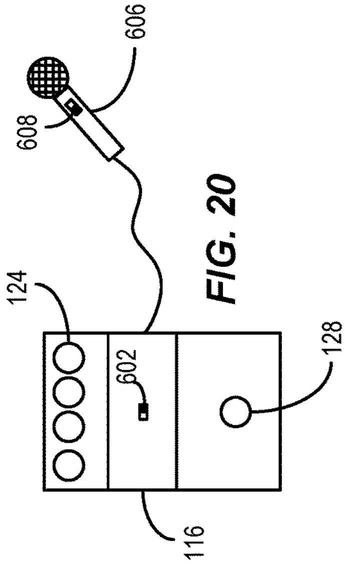
FIG. 20 is an example variation of an implementation of a musical instrument effect processor consistent with certain embodiments of the present invention.
Figure 22:
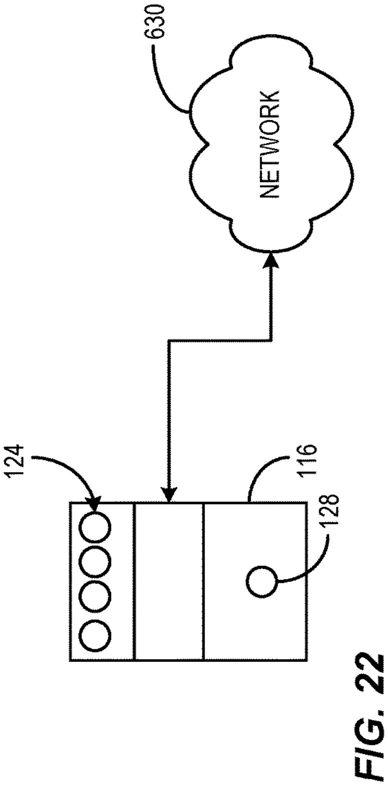
FIG. 22 is another example variation of an implementation of a musical instrument effect processor consistent with certain embodiments of the present invention.

Many variations are possible in implementing the present teachings. Several are generally depicted in FIGS. 20-22, but others are possible and will be apparent to those skilled in the art upon consideration of the present teachings. In FIG. 20, a variation of musical instrument effect processor 116 is depicted with is illustrated to have a switch 602 forming a part of user interface 588. In this implementation, a sound can be directly captured using an input connected to a source of sound such as a microphone 606 (which is depicted as a proxy for any source of electrical input representing sound including a musical instrument with raw output or with an output colored with another type of effect). In this example, the musical instrument effect processor 116 can be switched with switch 602 (or alternatively with a switched input jack or input jack that detects the presence of an input signal) to carry out the functions previously described in connection with the smartphone 104. That is, the switch can be placed in a "capture" mode in which the sound from an external source such as microphone 606 in order to carry out the capture of the sound to be processed and converted to DSP parameters, sound samples etc. in the same manner previously described. Those parameters are then simply ported to the appropriate memory locations to carry out the desired effect. After the sound is captured, the switch 602 can be placed in a "play" position that converts the musical instrument effect processor 116 into a mode in which input signals from a musical instrument or the like are processed in order to color its sound using the special effect of the musical instrument effect processor 116 as programmed. In one implementation, the input jack for a musical instrument can serve double duty as an input for capturing a sound from microphone 606 or other source of sound.

Another variation is depicted in FIG. 21 in which the musical instrument effect processor 116 is equipped with its own internal microphone 610 for capturing sounds. Again the user interface 588 includes a switch 612 that is used to switch between a "capture" mode for capturing a sound sample at microphone 610 and a "play" mode to utilize the effect once the sound is processed and converted into the desired effect. In one example, the switch can be a momentary switch that when held implements the capture, but other variations are possible.

In an analogous implementation, the effect processor can form a part of a vocal microphone that is used by a singer and can be used to engage an effect during a performance at will without having to be located at a particular point on a stage for access to a control or without having to rely on a sound technician to engage or disengage an effect at a particular time.

One or more switches 608 may be provided to either turn the microphone on or off, or when the microphone is used in a manner discussed later, the microphone may contain its own effects processor such that the effects processor is cut in or out by use of a switch such as 608. In the example shown, switch 608 forms a part of the microphone housing and is intended to be but one depiction of one or more switches or other controls.

In another illustrative example as depicted in FIG. 22, the musical instrument effect processor 116 can utilize a data interface which is suitable for connection to a network (local, wide or Internet; wired or wireless) 630 in order to receive audio samples of audio that are generated or captured in another manner, or to receive DSP parameters that are generated from audio samples captured by a user or shared over a network.

Figure 24:
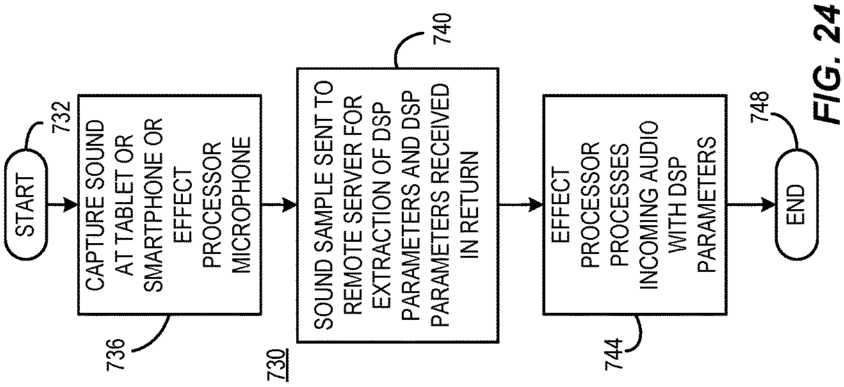
FIG. 24 is another alternative flow chart of an example of a process for extracting digital signal processing parameters from a sample of a sound in a manner consistent with certain embodiments of the present invention.
Figure 23:
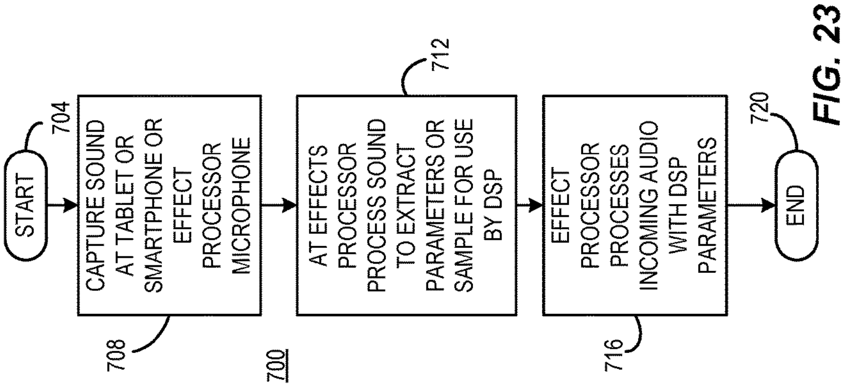
FIG. 23 is an alternative flow chart of an example of a process for extracting digital signal processing parameters from a sample of a sound in a manner consistent with certain embodiments of the present invention.

The above alternative examples give rise to the processes depicted in FIGS. 23-24 which depict, at a high level, variations in the processes described above. Referring to FIG. 23, process 700 starts at 704 after which a sound is captured at 708 at a tablet or smartphone or effects processor or microphone forming part of the effects processor or connected thereto or a stored sound file that is ported to the effects processor. The sound file is transferred to the effects processor if need be and the effects processor at 712 computes the DSP parameters as described above or uses the sound sample directly to produce the effect. At 716, the DSP in the effects processor then directly uses the DSP parameters to process the incoming audio signals from an instrument such as 132 and the process ends at 720.

A second alternative implementation is depicted in the example flow chart 730 of FIG. 24 starting at 732 after which the sound is captured at a tablet, smartphone, hand-held computer or effects processor using either an internal or attached microphone, or a stored sound can otherwise be input into the device at 736. The sound sample is digitized if necessary and then sent to a remote site such as via an Internet or other network connection for processing by remote signal processing at 740 and the DSP processing parameters are received in return. These parameters are loaded into the effects processor and the effects processor uses them to process incoming audio signals as described above at 744 and ends at 748.

It will be appreciated by one skilled in the art upon consideration of the present teachings that the musical instrument effects processor 116 can be implemented as a part of the musical instrument amplifier 136 or as a part of the musical instrument such as guitar 132 or any other musical instrument. In this manner, the effect can be turned on or off by use of a switch either mounted on the guitar or other instrument 132 or coupled thereto; a switch coupled to, forming a part of or connected to the musical instrument amplifier 136, or embedded within a microphone housing of a microphone such as 606 without limitation. In addition, while the effects discussed herein can be generated as a result of capture of a sound as discussed extensively, this does not preclude the effects processor 116 from being utilized to generate other effects. For example, an effects processor such as 116 can be embedded within microphone 606 (e.g., a pitch corrector, a reverb effect, or a harmony generator) that can be switched on by the user at will by use of a simple electromechanical switch or by use of any suitable sort of remote controller. While such a microphone might have a form factor resembling that of microphone 606, the depiction in FIG. 21 illustrates that the microphone and signal processor may be co-located. In this case, the microphone may be used for either capture of the initial sound 108 or in place of the musical instrument (i.e., the microphone serves as the musical instrument) or the microphone may be used for both purposes without limitation.

When the microphone contains its own effects processor, the present teachings are not intended to limit such an effects processor to a digital signal processing based effects processor since analog effects can be implemented within a microphone housing and switched on or off at will. This is especially easy to realize in microphones that utilize phantom power that is supplied externally to the microphone or when the microphone is a wireless microphone that utilizes a battery to power the microphone, which can also power the effect. Moreover, the microphone housing for a wireless microphone can be considered to include a transmitter housing normally used in conjunction with such microphone (e.g., a transmitter that is attached to a belt or the like.) Similarly, the DSP based effects processor 116 can incorporate analog signal processing along with the DSP if desired without limitation.

Figure 25:
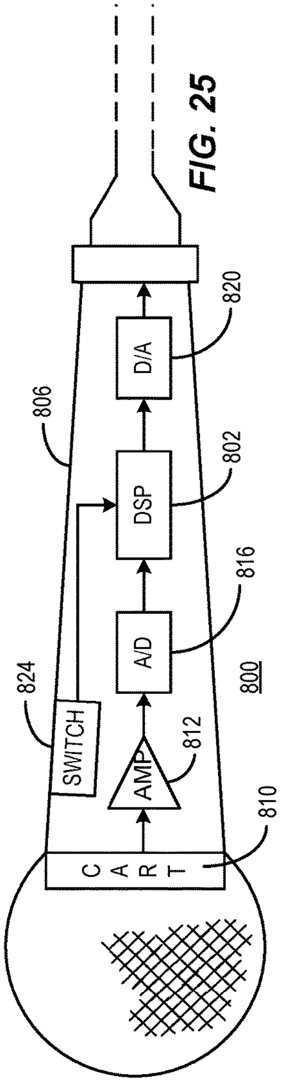
FIG. 25 is a diagram of one example implementation of a microphone 800 having an embedded effects processor consistent with certain embodiments of the present invention.

Now consider the example of a microphone having an embedded DSP, one example of which is depicted in FIG. 25. The above discussion of capturing a sound and using that sound 108 to produce an audio effect using the DSP is generally applicable. But, more generally an effect circuit such as those using a digital signal processor such as 802 can be provided within (integral to) a microphone 800's housing 806. The audio that is to be processed by the effect can be captured by the microphone at a microphone cartridge or equivalent 810, possibly amplified by an amplifier 812 and converted to digital at analog to digital converter 816 for processing by a programmed DSP 802. The DSP 802 then produces an output that is converted back to analog at digital-to-analog processor 820 for further processing at an amplification system such as a public address (PA) system. A switch 824 or other interface (where switch 824 is to be considered an abstraction of any suitable user interface) can be used to change the mode of DSP to various effects or to turn on or off a programmed effect (including but not limited to those discussed above). In one example, the effect can be pitch correction and in other cases a megaphone simulation or harmonizer effect or reverb or echo effect, notch filtering for feedback control, frequency response shaping or other functions or special effects that can be implemented by the DSP 802, or alternatively or in conjunction with an analog effect processing circuit.

When a vocal performer is performing, often the performer is dancing or otherwise moving about the stage. If a vocal effect is to be turned on or off, it may require that the vocal performer position himself or herself at a stage position that enables access to a switch for an effect, thereby limiting the choreography. Otherwise, the performer will often have to depend upon a sound technician to make the switch—limiting the ability to improvise with both vocals and with choreography. By placing the control within the easy reach by integration with the microphone housing (or an attached transmitter in the case of a wireless microphone) the vocal performer can take full control of the performance both from a choreography perspective and an effect enable/disable perspective. While the present illustration depicts a hand-held microphone, for purposes of this discussion, in the case of a wireless microphone having a transceiver that is worn on the body, the DSP and associated circuitry could be situated equivalently within a housing for the transmitter, and any user interface can either directly form a part of the transmitter housing or may be connected to the transmitter in a manner that permits the user to make the switching (e.g., by placing the switching on the hand held microphone or by providing separate switching that can be easily accessed by the performer).

Figure 26:
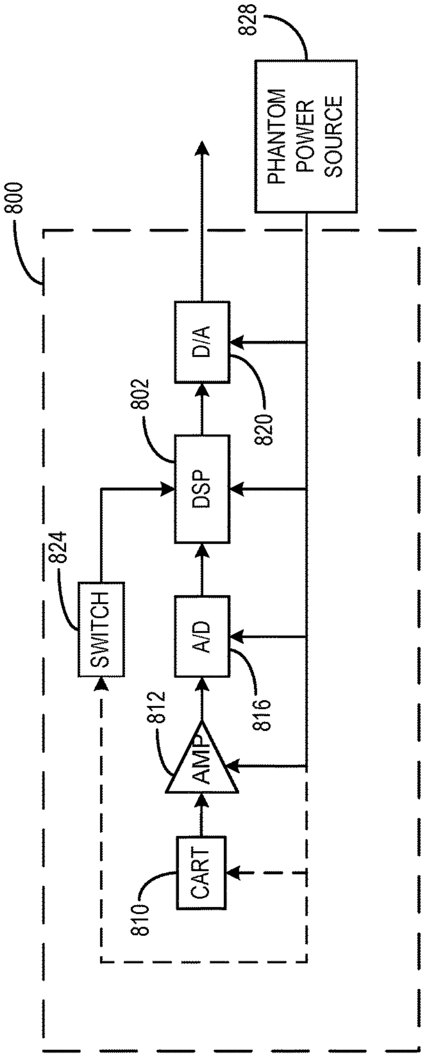
FIG. 26 is an example block diagram of one example implementation of the processor of microphone 800 consistent with certain embodiments of the present invention.

Referring to FIG. 26, the above illustrated microphone is shown in block diagram form for an example case where the microphone is supplied with phantom power. In such a case, the phantom power source 828 can be readily utilized to supply power to circuitry requiring DC power. While not explicitly shown, the system can either provide a true bypass to the DSP circuitry when disabled, or the DSP can be set to a mode where there is essentially no special effects processing going on when disabled, or where the DSP is providing a DSP spectral contouring or feedback control process when an effect is turned off, or the output can be taken from amplifier 812 using simple switching. Other arrangements are also possible. It should also be borne in mind that in the present case of a microphone with integral signal processing that such processing can be done using analog circuitry as well as or in addition to digital signal processing.

Figure 27:
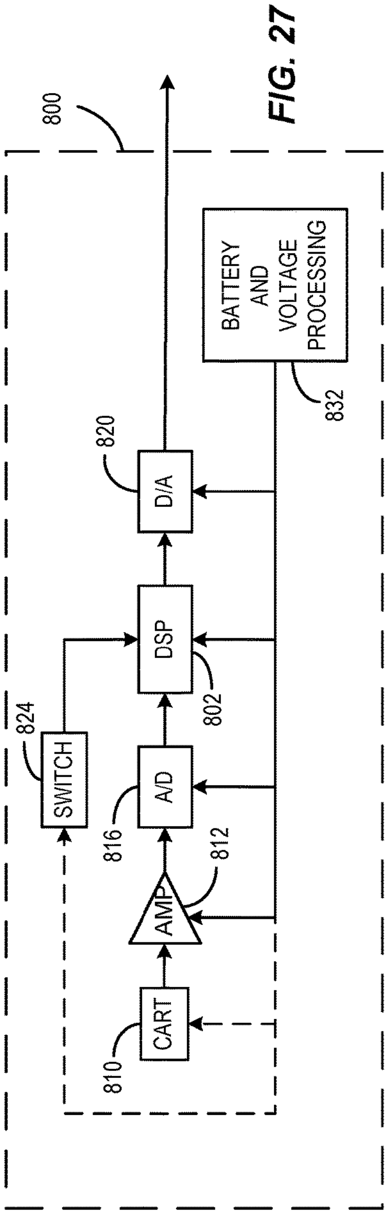
FIG. 27 is a block diagram of one example implementation of a wired microphone 800 having an embedded effects processor consistent with certain embodiments of the present invention.

Referring now to FIG. 27, in this implementation, the microphone is a wired microphone that is powered by a battery 832 in order to supply power to the DSP circuitry and possibly the microphone cartridge (e.g., for an electret microphone), but otherwise operates in a manner similar to those previously described.

Figure 28:
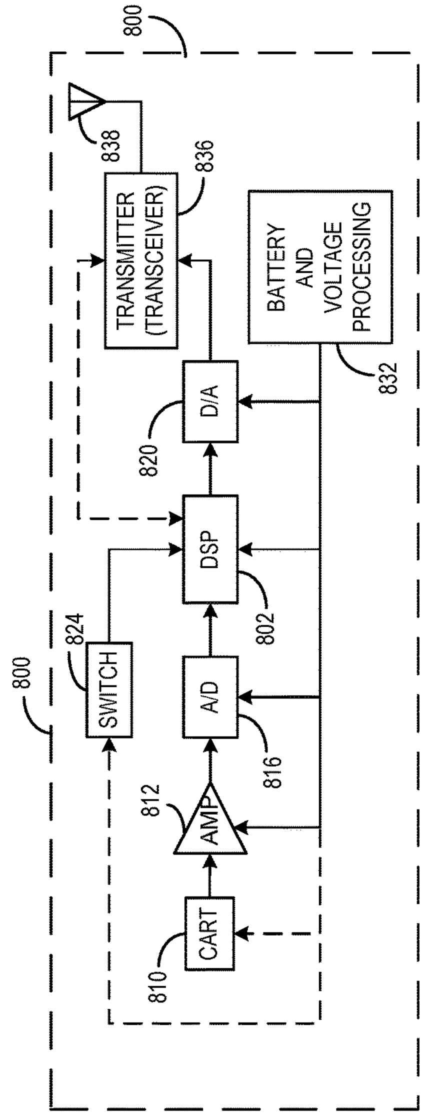
FIG. 28 is a block diagram of one example implementation of a wireless microphone 800 having an embedded effects processor consistent with certain embodiments of the present invention.

Referring now to FIG. 28, in this implementation, the microphone is a wireless microphone that is powered by a battery 832 in order to supply power to the DSP circuitry, transmitter (transceiver) 836 and possibly the microphone cartridge (e.g., for an electret microphone), but otherwise operates in a manner similar to those previously described. In this case, the transmitter or transceiver 836 sends and receives via an antenna 836. This transmission path can be used to transmit the sounds picked up by the microphone as well as signaling for selecting transmission channel and possibly for wirelessly programming the DSP.

In each implementation depicted above, the concept of capturing a sound 108 using the microphone can be implemented and the processing to produce DSP parameters can be either carried out at the DSP or by various communication mechanisms with either a smart phone, a tablet or other hand held computer, or via a server on the Internet or using any of the other techniques described. Moreover, the DSP can also accept programming to carry out more conventional effects such as harmonization, pitch correction, equalization, reverb, echo, etc. that can be separately programmed in any suitable manner without limitation.

Figure 29:
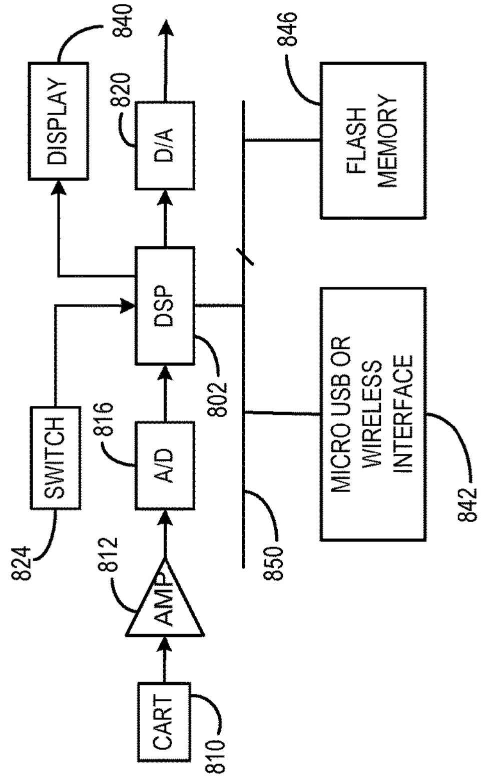
FIG. 29 is a block diagram of one example implementation of a microphone 800 having an embedded effects processor and USB interface and flash memory and display consistent with certain embodiments of the present invention.

FIG. 29 is a block diagram of one example implementation of a microphone 800 having an embedded effects processor and USB interface and flash memory and display consistent with certain embodiments of the present invention. In this example implementation, the switch 824 may be multiple use switches or other user interface controls and a display 840 can provide the user with an indication which effect is either active or can be activated by use of switches 824. Additionally, an interface such as a universal serial interface or micro-USB interface or any suitable digital interface 842 including wired such as USB or wireless such as BlueTooth or other wireless or wired protocol and connector where applicable can be used to couple data to the microphone in order to program the DSP 802 via various bus or buses generally depicted as 850. Additionally, removable flash memory 846 can be provided for storage and easy reprogramming of a repertoire of special effects if desired.

Figure 30:
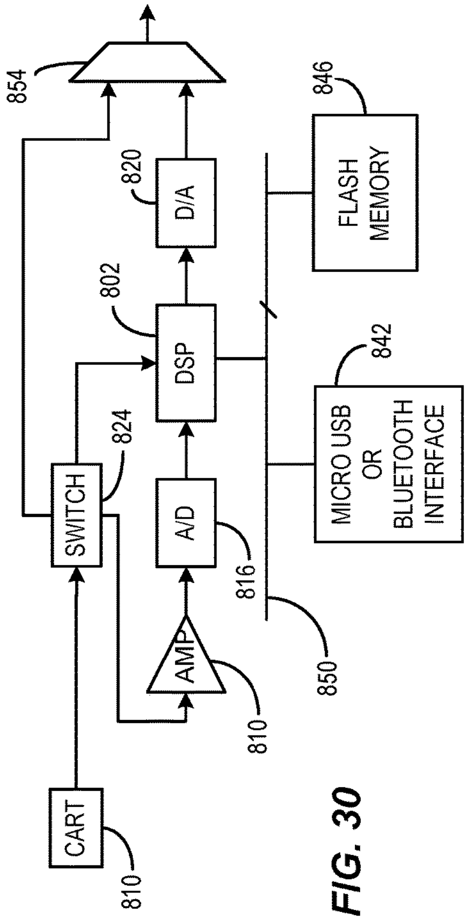
FIG. 30 is a block diagram of one example implementation of a microphone 800 having an embedded effects processor with a USB interface and flash memory with bypass switching or combination of dry and wet microphone signals consistent with certain embodiments of the present invention.

FIG. 30 is a block diagram of one example implementation of a microphone 800 having an embedded effects processor with a USB interface and flash memory with bypass switching or combination of dry and wet microphone signals consistent with certain embodiments of the present invention. In this implementation, switch 824 can be utilized to switch either the raw output of cartridge 810 to the output through a multiplexer or adder 854, or can be used to switch the processed signal from the DSP path to the output of 854, or to provide a combination thereof by mixing the two signals in a desired proportion. Many variations will occur to those skilled in the art upon consideration of the present teachings.

It will be appreciated that amplifier 810 may not be necessary in some implementations, but provides a broader range of amplitudes from the cartridge from which the digitized version of the audio can be processed. Similarly, it will be evident that if a digital output is desired, there is no need for the D/A converter 820, but it can either be used when needed or not included at all depending upon the application. Many other variations will occur to those skilled in the art upon consideration of the present teachings including omission of either the interface 842 or the flash memory card 846 or both if one wishes to produce a microphone with one or more predefined special effects, or use the techniques discussed above to create an effect from a sound 108 captured by the microphone. Many other variations are possible.

Figure 31:
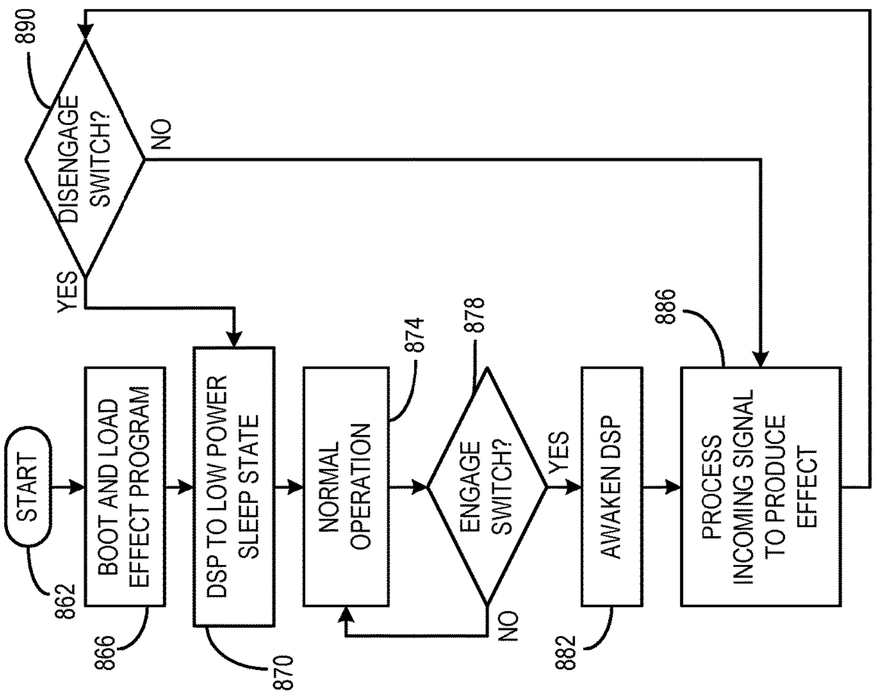
FIG. 31 is an example of a flow chart of a process for operation of a microphone (or musical instrument) with integral DSP in a manner consistent with certain embodiments of the present invention.

Referring now to FIG. 31, one example method 860 of operation of a microphone such as those depicted herein is discussed. In this example, starting at 862 after which the DSP boots and loads a desired effect program and associated program parameters for the effect. The DSP can then be placed in a lower power state at 870 and normal operation of the microphone commences at 874 where it remains until a switch is engaged at 878. When the switch is engaged, the DSP begins operating at normal speed (awakens) at 882 and begins processing the incoming signal from the microphone cartridge to process the incoming audio signal to create the desired special effect that is programmed and selected. This process continues until the switch is disengaged (or operated again) at 890 to discontinue the special effect at which point the DSP can return to the lower power sleep state at 870. In other implementations, it may not be practical or possible to utilize a lower power state for the DSP, in which case the actions 870 and 882 are removed from the process.

Figure 32:
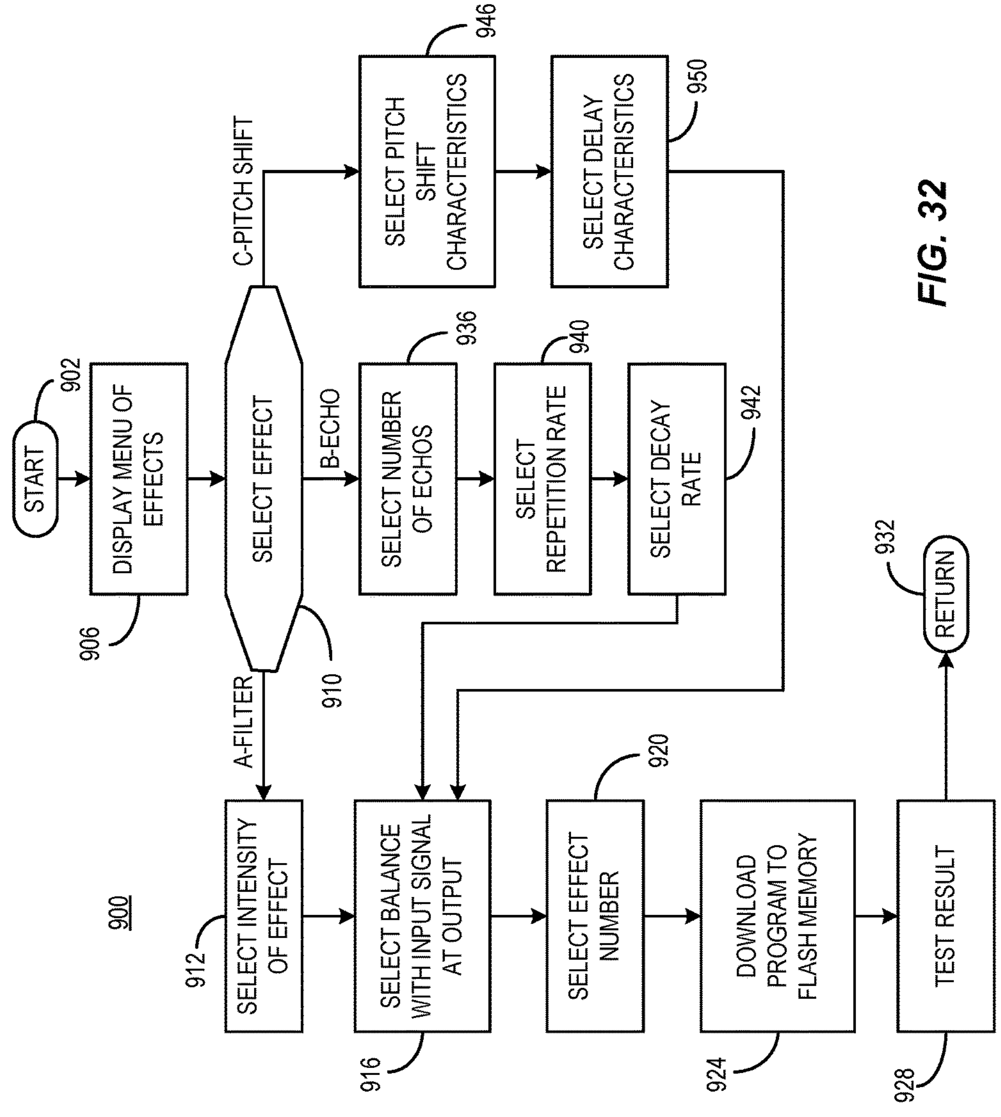
FIG. 32 is an example flow chart of another example process for operation of a microphone having an embedded effects processor consistent with certain embodiments of the present invention.

FIG. 32 is an example flow chart of another example process 900 for operation of a microphone having an embedded effects processor consistent with certain embodiments of the present invention. In this example, the user chooses through a variety of menus presented on a user interface that is either integral or attached to the microphone (e.g., via a smartphone or hand-held computer). Process 900 starts at 902 after which a menu of effects is displayed at 906. For ease of illustration, three effects are depicted: A—a digital filtering effect, B— an echo effect, and C— a pitch shifting effect.

The processing that follows is intended as an illustrative example of the effects parameters that a user might be able to select from in order to customize the effect desired. Other variations are possible, with the present example serving merely as an illustration. The user selects an effect from the menu at 910 and if effect A is selected, the process proceeds to 912 where the intensity of the effect can be varied. At 916 a blending of the effect with a dry signal is selected and an effects number or name (or song name) to be displayed on a microphone display for ready reference is selected at 920. At 924, the desired effect is downloaded to the microphone's flash memory and the results can be tested at 928. The process returns for refinement or for use of the microphone at 932.

If on the other hand, an echo effect is desired and B is selected, a user might select a number of echos at 936, a repetition rate at 940 and a decay rate at 942 before passing control to 916 for processing as previously described.

If C is selected, a pitch shifting function might be selected in order to shift the vocalist's pitch or contribute a harmonic to the pitch or pitch correct based on a standard (for example). In this case, at 946 pitch shifting characteristics can be set (e.g., pitch standard such as A—440 hz, key or mode of a harmony, etc.) and then delay characteristics for harmonies might be selected at 950 before passing control to 916 for further processing as previously described. These examples A, B and C are provided as merely illustrative of one technique for loading and manipulating various effects, but others will occur to those skilled in the art upon consideration of the present teaching, and these examples are not intended to be limiting in any manner.

Figure 33:
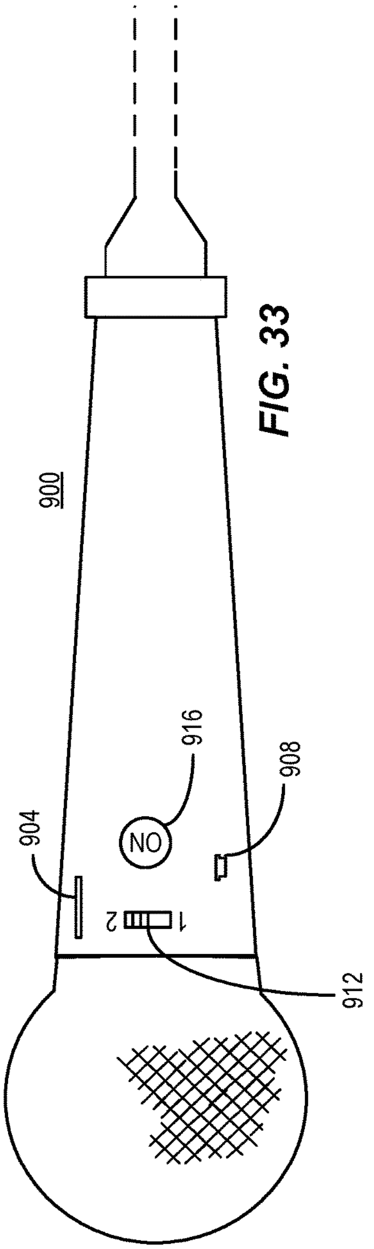
FIG. 33 depicts one example of a microphone with a simple user interface for control of an embedded effects processor consistent with certain embodiments of the present invention.

FIG. 33 depicts one example of a microphone 900 with a simple user interface for control of an embedded effects processor consistent with certain embodiments of the present invention. In this example, the microphone 900 can include a slot 904 for receiving a memory card and may include a mini or micro USB port 908 for input of program and DSP parameters (e.g., from a smartphone). A switch 912 is provided to select between one of two (or more) stored effects and a switch 916 is used to turn the effects on or off. Many variations are possible.

Figure 34:
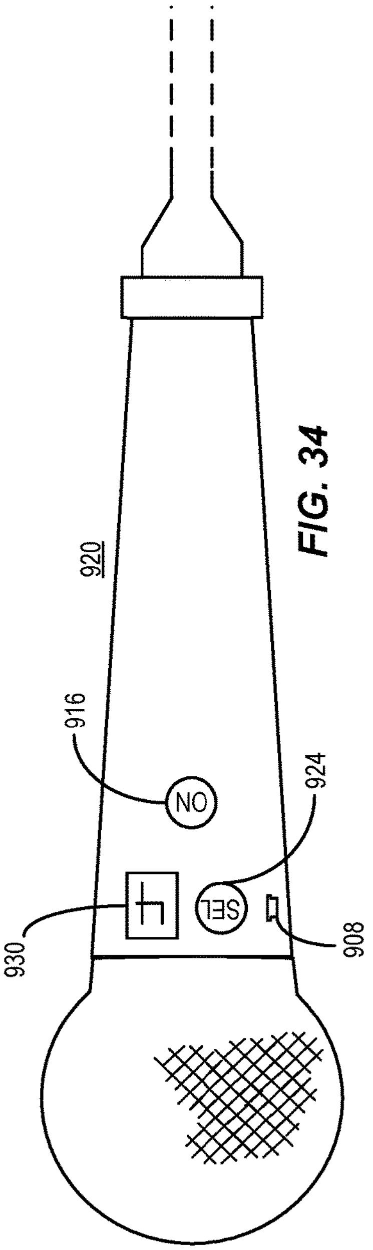
FIG. 34 depicts another example of a microphone with a slightly more elaborate user interface for control of an embedded effects processor consistent with certain embodiments of the present invention.

FIG. 34 depicts another example of a microphone 920 with a slightly more elaborate user interface for control of an embedded effects processor consistent with certain embodiments of the present invention. In this case the effect is again engaged or disengaged using switch 916 and the DSP can be programmed via port 908. In this case, the user can select from among several numbered (or otherwise labeled) effects using select switch 924 with the various effects being represented by a name, label or number designation in a display 930.

It is to be carefully noted that several techniques have been illustrated that depict various mechanisms for capturing a sample of sound and using that sound sample as a pattern (e.g., in the frequency or time domain) to color or otherwise modify an input signal from a musical instrument. However, these examples are only intended to be illustrative of the many things that can be done using digital signal processing to extract features from a sound and modify a musical instrument (or voice) using a characteristic extracted from that initial sound. The possibilities of how the initially captured sound can be used to generate DSP parameters to modify an input to the musical instrument effects processor and produce an output therefrom are limitless. Each such method of analysis of the original sound for purposes of later modifying an incoming instrument signal can be arranged as its own freestanding App for use by the smartphone, tablet, etc. Many such variations will occur to those skilled in the art upon consideration of the present teachings.

Thus, a device consistent with certain implementations discussed herein have a microphone that is configured to receive audio signals and create an electrical representation of the audio signal. An analog to digital converter converts the electrical representation of the audio signal into a digitized sample of the audio signal. A processor is adapted to perform an analysis of the digitized sample of the audio signal to extract signal characteristics of the audio signal and to generate digital signal processor parameters therefrom. The processor is configured to carry out a process that creates a set of digital signal processing parameters that, when loaded into one or more digital signal processors, process an input signal by altering the input signal using the digital signal processing parameters. An interface is configured to transport the digital signal processing parameters to a musical instrument effects processor.

In certain implementations, the digital signal processing parameters are arranged to cause generation of non-fundamental frequencies associated with a fundamental frequency of an input signal in the effects processor. In certain implementations, the processor is further configured to identify a fundamental frequency of the digitized sample of the audio signal. In certain implementations, the processor is further configured to identify a relative level of non-fundamental frequencies of the digitized sample of the audio signal. In certain implementations, the device is embodied in at least one of a tablet computer and a smartphone.

In certain implementations, the processor is accessed by the device via a network connection or the processor may reside in the musical instrument effects processor. In certain implementations, the digital signal processing parameters are arranged to cause generation of non-fundamental frequencies associated with a fundamental frequency of an input signal in the effects processor. In certain implementations, the digital signal processing parameters are arranged to cause the electrical representations of input audio signals to be modified by playback of the at least the portion of the sample of the audio signal. In certain implementations, the digital signal processing parameters are arranged to cause the electrical representations of input audio signals to be augmented by a pitch shifted version of the digital copy of the sample of the audio signal. In certain implementations, the digital signal processing parameters are arranged to cause the electrical representations of input audio signals to be modified by generation of harmonics of a fundamental frequency of the input signal. In certain implementations, the digital signal processing parameters are arranged to cause the electrical representations of input audio signals to be modified by detecting a pitch of the input audio signal and modifying the input audio signal using pitch shifted versions of the sample of the audio signal. In certain implementations, the digital signal processing parameters are arranged to cause the electrical representations of input audio signals to be filtered at a pitch shifted version of a spectrum derived from the sample of the audio signal.

A method of creating an electronic audio effect involves capturing a sample of an audible sound; analyzing the sample of audible sound to extract at least one characteristic of the audible sound; and porting the at least one extracted characteristic of the audible sound to a digital signal processor residing in a musical instrument effects processor via a data interface so as to configure the musical instrument effects processor to modify electrical representations of input audio signals using the extracted characteristics to create the electronic audio effect.

In certain implementations, at least one extracted characteristic comprises a digital copy of at least a portion of the sample of audio. In certain implementations, the musical instrument effects processor is configured to modify electrical representations of input audio signals by playback of the at least the portion of the audio sample. In certain implementations, the musical instrument effects processor is configured to modify electrical representations of input audio signals by pitch shifting the digital copy of the captured sample of the audio sound. In certain implementations, the musical instrument effects processor is configured to modify electrical representations of input audio signals by generation of harmonics of a fundamental frequency of the input signal. In certain implementations, the musical instrument effects processor is configured to modify electrical representations of input audio signals by detecting a pitch of the input audio signal and modifying the input audio signal using pitch shifted versions of the captured sample of the audio sound. In certain implementations, the musical instrument effects processor is configured to modify electrical representations of input audio signals filtering the electrical representation of the input audio signals at a pitch shifted version of a spectrum derived from the captured sample of the audio sound.

Another device has a microphone that is configured to receive audio signals and create an electrical representation of the audio signal. An analog to digital converter converts the electrical representation of the audio signal into a digitized sample of the audio signal. A processor is adapted to perform an analysis of the digitized sample of the audio signal to extract signal characteristics of the audio signal and to generate digital signal processor parameters therefrom. The processor is configured to carry out a process that: identifies a fundamental frequency of the digitized sample of the audio signal, identifies a relative level of non-fundamental frequencies of the digitized sample of the audio signal, and creates a set of digital signal processing parameters that, when loaded into a digital signal processor, process an input signal by generation of relative non-fundamental frequencies associated with a fundamental frequencies of the input signal. An interface is configured to transport the digital signal processing parameters to a musical instrument effects processor.

A musical instrument effects processor consistent with certain implementations has an interface that is configured to receive digital signal processing parameters from a hand-held computer. The digital signal processing parameters are derived from audio information captured by a microphone forming a part of the hand-held computer. One or more digital signal processors are provided along with an audio input to the musical instrument effects processor configured to receive audio signals from a musical instrument. The one or more digital signal processors are configured to modify signals received at the audio input to produce audio output signals. An audio output coupled to the one or more digital signal processors that is configured to provide the audio output signals as an output.

In certain implementations, the digital signal processing parameters comprise a digital copy of at least a portion of the sample of audio. In certain implementations, the processing comprises pitch shifting the digital copy of the sample of audio. In certain implementations, the processing comprises generation of harmonics of a fundamental frequency of the input signal. In certain implementations, the processing comprises detecting a pitch of the input signal and modifying the input signal using pitch shifted versions of a signal produced using the stored digital signal processing parameters.

Another device consistent with the present teachings has a microphone or other input that is configured to receive audio signals and create an electrical representation of the audio signal. A signal processor is adapted to perform an analysis of the audio signal to extract signal characteristics of the audio signal and to generate digital signal processor parameters therefrom. An interface is configured to transport the digital signal processor parameters to a musical instrument effects processor.

In certain implementations, the digital signal processing parameters comprise a digital copy of at least a portion of the sample of audio. In certain implementations, the processing comprises pitch shifting the digital copy of the sample of audio. In certain implementations, the processing comprises generation of harmonics of a fundamental frequency of the input signal. In certain implementations, the processing comprises detecting a pitch of the input signal and modifying the input signal using pitch shifted versions of a signal produced using the stored digital signal processing parameters.

A method consistent with certain of the present teachings involves capturing a sample of audio at a hand held computer device; generating stored digital signal processing parameters from the sample of audio; storing the digital signal processing parameters; and processing an input signal from an electrical musical instrument using a digital signal processor that modifies the input signal using the stored digital signal processing parameters.

In certain implementations, the digital signal processing parameters are transferred from the hand held computer device to a musical instrument effect processor that carries out the processing via an interface, and where the interface comprises a wireless interface. In certain implementations, the digital signal processing parameters comprise a digital copy of at least a portion of the sample of audio. In certain implementations, the processing comprises pitch shifting the digital copy of the sample of audio. In certain implementations, the processing comprises generation of harmonics of a fundamental frequency of the input signal. In certain implementations, the processing comprises detecting a pitch of the input signal and modifying the input signal using pitch shifted versions of a signal produced using the stored digital signal processing parameters.

Another method consistent with certain of the present teachings involves capturing a sample of audio at either a hand held computer device such as a tablet, smartphone or even by a microphone forming a part of or connected to an effects processor; generating stored digital signal processing parameters from the sample of audio, where this generating can be carried out at the hand held computer device, tablet, smartphone, effects processor or even via a remote connected server connected to either the effects processor or to the hand held device (tablet, smartphone, etc.); storing the digital signal processing parameters at the effects processor; and processing an input signal from an electrical musical instrument using a digital signal processor that modifies the input signal using the stored digital signal processing parameters.

Another method involves capturing an audio sound at a hand held computing device; extracting a characteristic from the audio sound; and programming one or more digital signal processors in a musical instrument effects processor to modify an input signal to the musical instrument effects processor using the extracted characteristic.

In certain implementations, the digital signal processing parameters are transferred from the hand held computer device to a musical instrument effect processor that carries out the processing via an interface, and where the interface comprises a wireless interface. In certain implementations, the characteristic comprises a digital representation of a least a sample of the audio sound. In certain implementations, the programming includes instructions that cause pitch shifting the digital copy of the sample of audio. In certain implementations, the programming comprises processing comprises instructions to generate harmonics of a fundamental frequency of the input signal. In certain implementations, the programming comprises instructions that detect a pitch of the input signal and modify the input signal using pitch shifted versions of a signal produced using the stored digital signal processing parameters.

A non-transitory computer readable storage device storing instructions that when executed on one or more programmed processors carry out a process that receives a digital representation of an audio signal received by a microphone forming a part of a portable computing device; performs an analysis of the digitized sample of the audio signal to extract signal characteristics of the audio signal and to generate digital signal processor parameters therefrom; and configures an interface to transport the digital signal processing parameters to a musical instrument effects processor.

In certain implementations, a fundamental frequency of the digitized sample of the audio signal is obtained, for example using an FFT. In certain implementations, a relative level of non-fundamental frequencies of the digitized sample of the audio signal is identified. In certain implementations, the one or more processors to create a set of digital signal processing parameters that, when loaded into a digital signal processor, process an input signal by generation of relative non-fundamental frequencies associated with a fundamental frequency of the input signal, for example using an inverse FFT that is pitch shifted. In certain implementations, a pitch shifted version of the digital representation of the audio signal is created.

A device has a microphone or other input that is configured to receive audio signals and create an electrical representation of the audio signal. An analog to digital converter converts the electrical representation of the audio signal into a digitized sample of the audio signal. A programmed processor is adapted to perform an analysis of the digitized sample of the audio signal to extract signal characteristics of the audio signal and to generate digital signal processor parameters therefrom. The signal processor is configured to carry out a process that: identifies a fundamental frequency of the digitized sample of the audio signal, identifies a relative level of non-fundamental frequency components of the digitized sample of the audio signal, and creates a set of digital signal processing parameters that, when loaded into a digital signal processor, process an input signal by generation of relative non-fundamental frequencies associated with a fundamental frequencies of the input signal. An interface that is configured to transport the digital signal processing parameters to a musical instrument effects processor.

In certain implementations, the DSP parameters may not need to be ported external to the device if the device carries out the DSP processing itself. In any of the disclosed implementations, device or method, the various data interfaces can be wired or wireless interfaces.

Another device has a microphone or input that is configured to receive audio signals and create an electrical representation of the audio signal. An interface is configured to transport the electrical representation of the audio signal (e.g., in digitized form) to a musical instrument effects processor. A signal processor (e.g., in the effects processor) is adapted to perform an analysis of the audio signal to extract signal characteristics of the audio signal and to generate digital signal processor parameters therefrom. These DSP parameters can then be used to modify an input signal to the musical instrument effects processor and produce an output therefrom.

In certain implementations consistent herewith, a microphone has a microphone housing containing a microphone element. An effects processor resides within the microphone housing. A switch or other user interface element is configured to turn an effect generated by the effects processor on and off under user control to permit the user to enable and disable the effect carried out on sounds entering the microphone. The switch is coupled operatively to the microphone, for example by being attached to the microphone housing or to a housing for a transmitter in a wireless microphone.

A method in accord with certain implementations involves capturing an audio sound at a hand held computing device; extracting a characteristic from the audio sound; and programming one or more digital signal processors in a musical instrument effects processor to modify an input signal to the musical instrument effects processor using the extracted characteristic.

A method consistent with certain implementations involves capturing an audio sound at a microphone; extracting a characteristic from the audio sound; and programming one or more digital signal processors in a musical instrument effects processor to modify an input signal to the musical instrument effects processor using the extracted characteristic, where the digital signal processor resides in one of: a housing for the microphone, a part of a musical instrument such as a guitar or bass guitar, or a musical instrument amplifier.

In certain implementations, a hand held computer has a set of parameters for use by a musical instrument effects processor. A wireless interface can be used to communicate the parameters to the musical instrument effects processor.

In certain implementations, a signal processor is provided within a microphone housing (which includes a housing for a wireless transmitter if any associated with the microphone). A user interface permits a user of the microphone to engage or disengage a DSP that produces special audio effects residing in the microphone housing at will. In certain implementations, a flash memory card can store multiple special effects programming and DSP parameters. In certain implementations, the microphone has a user interface permitting display and/or selection from among plural special effects. The microphone can be wired or wireless. The microphone may also have a wired or wireless interface (e.g., BlueTooth or USB connection for loading special effects programming and parameters.

Many variations are possible without departing from the present teachings. For example, while certain implementations contemplate use of a microphone within a smart phone or tablet, a discrete microphone can also be used to capture a sound, or a recorded or stored sound sample can be used directly. The processing to produce DSP parameters can be generated at any suitable processor including that of the effects processor 116, the smartphone or tablet 104 or a network or Internet connected processor or processors. Any use of the sampled audio to manipulate the input audio from instrument 132 is contemplated, and both wet and dry signals can be blended as desired. Many other implementations will occur to those skilled in the art upon consideration of the present teachings.

Those skilled in the art will appreciate, upon consideration of the above teachings, that the program operations and processes and associated data used to implement certain of the embodiments described above can be implemented using disc storage as well as other forms of storage devices including, but not limited to non-transitory storage media such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term “non-transitory” is intended only to exclude propagating signals and waves. All alternative storage devices should be considered equivalents regardless of how they are arranged or partitioned.

Certain example embodiments described herein, are or may be implemented using one or more programmed processors including digital signal processors and microcontrollers executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, the location of production of the DSP parameters can vary from a tablet, smartphone, hand held computer, remote computer/server accessed via the Internet or at the musical effects instrument processor itself without limitation. Additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A music effects processor, comprising:
- one or more digital signal processors;
- an audio input to the music effects processor configured to receive a time domain audio signals;
- an analog to digital converter coupled to the audio input that is configured to convert the time domain audio signal into a time domain digital audio signal that is input to the one or more digital signal processors;

where the one or more digital signal processors are configured to:
- process the time domain digital audio signal to isolate a fundamental frequency component of a frequency domain representation of the digital audio signal,
- generate a modified frequency spectrum representation having a modified fundamental frequency equal to the fundamental frequency component,
- convert the modified frequency spectrum representation to a modified time domain digital audio signal; and
- a digital to analog converter that is configured to convert the modified time domain digital audio signal to an analog output signal.

2. The music effects processor according to claim 1, where the one or more digital signal processors modify the frequency domain representation by inserting new frequency components into the modified frequency spectrum representation.

3. The music effects processor according to claim 1, where the one or more digital signal processors modify the frequency domain representation by deleting certain frequency components of the frequency domain representation.

4. The music effects processor according to claim 1, where the one or more digital signal processors modify the frequency domain representation by replacing at least a portion of the frequency domain representation with a different frequency spectrum.

5. The music effects processor according to claim 4, where the different frequency spectrum comprises a frequency spectrum of a sample of audio information.

6. The music effects processor according to claim 1, where the one or more digital signal processors processes the time domain digital audio signal to isolate a fundamental frequency component by using a pitch detector that detects a pitch of the time domain audio signal and where the one or more digital signal processors modify the time domain audio signal using pitch shifted versions of a frequency spectrum of a sample of audio information.

7. The music effects processor according to claim 1, where the processing of the time domain digital audio signal is carried out using a discrete Fourier transform.

8. The music effects processor according to claim 1, where the converting of the modified frequency spectrum is carried out using an inverse discrete Fourier transform.

9. A music effects processor, comprising:
- one or more digital signal processors;
- an audio input to the music effects processor configured to receive time domain audio signals;
- where the one or more digital signal processors are configured to modify the time domain signals received at the audio input by converting the time domain audio signals into a frequency domain audio signal that contains at least a fundamental frequency component, and modifying the frequency domain audio signals to produce modified audio output signals; and
- an audio output coupled to the one or more digital signal processors that is configured to provide the modified audio output signals as an output.

10. The music effects processor according to claim 9, where the one or more digital signal processors modify the frequency domain representation by inserting new frequency components into the frequency domain representation.

11. The music effects processor according to claim 9, where the one or more digital signal processors modify the frequency domain representation by deleting certain frequency components of the frequency domain representation.

12. The music effects processor according to claim 9, where the one or more digital signal processors modify the frequency domain representation by replacing at least a portion of the frequency domain representation with a different frequency spectrum.

13. The music effects processor according to claim 12, where the different frequency spectrum comprises a frequency spectrum of a sample of audio information.

14. The music effects processor according to claim 9, further comprising a pitch detector that detects a pitch of the input signal and where the one or more digital signal processors modify the input signal using pitch shifted versions of a frequency spectrum of a sample of audio information.

15. The music effects processor according to claim 9, where the converting of the time domain digital audio signal is carried out using a discrete Fourier transform.

16. The music effects processor according to claim 9, where the converting of the modified frequency spectrum is carried out using an inverse discrete Fourier transform.

17. A method of creating an electronic audio effect, comprising:
- at an audio input, receiving a time domain audio signals;

at one or more digital signal processors:
- converting the time domain audio signal to a frequency domain representation containing at least a fundamental frequency component,
- modifying the frequency domain representation to produce a modified frequency spectrum,
- converting the modified frequency spectrum to a modified time domain audio signal; and
- outputting the modified input signals as an output signal.

18. The method according to claim 17, where the modifying comprises at least one of:
- inserting new frequency components into the frequency domain representation, deleting certain frequency components of the frequency domain representation, and replacing at least a portion of the frequency domain representation with a different frequency spectrum.

19. The method according to claim 18, where the different frequency spectrum comprises a frequency spectrum of a sample of audio information.

20. The method according to claim 17, where the converting the time domain audio signal is carried out using a discrete Fourier transform, and where the converting the modified frequency spectrum is carried out using an inverse discrete Fourier transform.

* * * * *